(12) United States Patent
Wakita et al.

(10) Patent No.: US 8,652,224 B2
(45) Date of Patent: Feb. 18, 2014

(54) HYDROGEN GENERATOR, FUEL CELL SYSTEM AND THEIR OPERATING METHODS

(75) Inventors: Hidenobu Wakita, Kyoto (JP); Yukimune Kani, Osaka (JP); Seiji Fujihara, Osaka (JP); Kunihiro Ukai, Nara (JP); Akira Maenishi, Osaka (JP)

(73) Assignee: Panasonic Corporation, Osaka (JP)

( * ) Notice: Subject to any disclaimer, the term of this patent is extended or adjusted under 35 U.S.C. 154(b) by 1119 days.

(21) Appl. No.: 12/160,635

(22) PCT Filed: Jan. 15, 2007

(86) PCT No.: PCT/JP2007/050445
§ 371 (c)(1),
(2), (4) Date: Jul. 11, 2008

(87) PCT Pub. No.: WO2007/081016
PCT Pub. Date: Jul. 19, 2007

(65) Prior Publication Data
US 2010/0040915 A1    Feb. 18, 2010

(30) Foreign Application Priority Data

Jan. 13, 2006 (JP) .................................. 2006-005919
May 16, 2006 (JP) .................................. 2006-136198

(51) Int. Cl.
*C01B 3/36* (2006.01)
(52) U.S. Cl.
USPC ....................................................... 48/197 R
(58) Field of Classification Search
USPC ............... 48/61–118.5, 197 R–197 A, 127.1, 48/127.9; 422/129–242; 429/400–535
See application file for complete search history.

(56) References Cited

U.S. PATENT DOCUMENTS

| | | | |
|---|---|---|---|
| 4,391,790 A * | 7/1983 | Palm et al. | 423/574.1 |
| 6,296,679 B1 * | 10/2001 | Kato | 48/197 R |
| 6,475,454 B1 * | 11/2002 | Cole et al. | 423/246 |

(Continued)

FOREIGN PATENT DOCUMENTS

| | | |
|---|---|---|
| JP | 2003-031247 | 1/2003 |
| JP | 2004-217435 | 8/2004 |

(Continued)

OTHER PUBLICATIONS

Oh, S.H. et al., "Carbon Monoxide Removal from Hydrogen-Rich Fuel Cell Feedstreams by Selective Catalytic Oxidation", Journal of Catalysis, 1993, pp. 254-262, vol. 142, Academic Press, Inc.

*Primary Examiner* — Imran Akram
(74) *Attorney, Agent, or Firm* — McDermott Will & Emery LLP

(57) ABSTRACT

A hydrogen generator (4) includes: a reformer (5) which is supplied with a raw material to generate a hydrogen-containing gas through a reforming reaction; a first gas supplying unit (1) which supplies a gas containing a nitrogen-containing compound to the reformer; a CO remover (7) which has an oxidation catalyst containing a metal to be poisoned by ammonia and uses the oxidation catalyst and an oxidation gas to remove carbon monoxide in the hydrogen-containing gas through an oxidation; a second gas supplying unit (3) which supplies the oxidation gas to the CO remover; and a control unit (10), wherein the gas containing the nitrogen-containing compound is supplied from the first gas supplying unit to the reformer during the reforming reaction, a fuel cell system (100) includes the hydrogen generator (4), and the control unit is configured to control to carry out a regeneration operation of the oxidation catalyst if a parameter regarding a cumulative amount of ammonia supplied to the CO remover has reached a predetermined threshold or more.

43 Claims, 8 Drawing Sheets

(56) References Cited

U.S. PATENT DOCUMENTS

| | | | |
|---|---|---|---|
| 6,521,204 B1 * | 2/2003 | Borup et al. | 423/652 |
| 7,060,118 B1 * | 6/2006 | Dybkjaer et al. | 48/127.9 |
| 2002/0182129 A1 * | 12/2002 | Filippi et al. | 422/188 |
| 2004/0111968 A1 * | 6/2004 | Day et al. | 48/197 FM |
| 2004/0258598 A1 | 12/2004 | Yao et al. | |
| 2005/0022450 A1 * | 2/2005 | Tan et al. | 48/198.3 |
| 2006/0090395 A1 * | 5/2006 | Rode et al. | 48/61 |
| 2006/0174608 A1 * | 8/2006 | Hu et al. | 60/286 |
| 2006/0213187 A1 * | 9/2006 | Kupe et al. | 60/286 |

FOREIGN PATENT DOCUMENTS

| | | |
|---|---|---|
| JP | 2005-116311 | 4/2005 |
| JP | 2005-190995 | 7/2005 |
| JP | 2006-169013 | 6/2006 |
| WO | WO 00/41799 | 7/2000 |
| WO | WO 2004071646 A2 * | 8/2004 |
| WO | WO 2005/000458 A2 | 1/2005 |

* cited by examiner

| AREA | A | B | C | D |
|---|---|---|---|---|
| NITROGEN CONCENTRATION (%) | 0.1 | 1 | 2 | 3 |
| AMMONIA CONCENTRATION (ppm) | 1 | 0.3 | 2 | 5 |

Fig. 7

| AREA | CITY | AREA CODE | SUPPLIER | NITROGEN CONCENTRATION (%) | THRESHOLD | DIAL |
|---|---|---|---|---|---|---|
| KANTO | TOKYO | 03 | A | a | S1 | 1 |
| | | | B | b | S2 | 2 |
| | | | C | c | S3 | 3 |
| | | | D | d | S4 | 4 |
| | | 042 | A | e | S5 | 5 |
| | | | B | f | S6 | 6 |
| KANSAI | OSAKA | 06 | E | g | S7 | 7 |
| | | | F | h | S8 | 8 |
| | | 072 | E | i | S9 | 9 |

Fig. 8

HYDROGEN GENERATOR, FUEL CELL SYSTEM AND THEIR OPERATING METHODS

RELATED APPLICATIONS

This application is the U.S. National Phase under 35 U.S.C. §371 of International Application No. PCT/JP2007/050445, filed on Jan. 15, 2007, which in turn claims the benefit of Japanese Application No. 2006-005919, filed on Jan. 13, 2006 and Japanese Application No. 2006-136198, filed on May 16, 2006, the disclosures of which Applications are incorporated by reference herein.

TECHNICAL FIELD

The present invention relates to a hydrogen generator which generates a hydrogen-containing gas by using a material gas containing nitrogen, a fuel cell system which is supplied with the hydrogen-containing gas from the hydrogen generator to a fuel cell thereof to generate electric power, and their operating methods.

BACKGROUND ART

A fuel cell cogeneration system (hereinafter simply referred to as "fuel cell system") having high electric power generation efficiency and high overall efficiency has been attracting attention as a distributed electric power generator capable of effectively utilizing energy.

The fuel cell system includes a fuel cell as a main body of an electric power generating portion. Examples of the fuel cell are a phosphoric-acid fuel cell, a molten carbonate fuel cell, an alkali aqueous solution fuel cell, a polymer electrolyte fuel cell, and a solid electrolyte fuel cell. Among these fuel cells, the phosphoric-acid fuel cell and the polymer electrolyte fuel cell (abbreviated as "PEFC") are preferably used as the fuel cell constituting the fuel cell system since their operating temperatures during an electric power generating operation are comparatively low. Especially, in the case of the polymer electrolyte fuel cell, an electrode catalyst does not deteriorate so much, and dispersion of polymer electrolytes does not occur as compared with the phosphoric-acid fuel cell. Therefore, the polymer electrolyte fuel cell is especially preferably used in applications, such as mobile electronic devices and electric cars.

Many of the fuel cells, such as the phosphoric-acid fuel cell and the polymer electrolyte fuel cell, use hydrogen as a fuel during the electric power generating operation. However, means for supplying hydrogen necessary during the electric power generating operation is not usually disposed in the fuel cell as an infrastructure. Therefore, in order to obtain electric power by the fuel cell system including the phosphoric-acid fuel cell or the polymer electrolyte fuel cell, hydrogen as the fuel needs to be generated at an installation location of the fuel cell system. On this account, in a conventional fuel cell system, a hydrogen generator is typically disposed with the fuel cell. The hydrogen generator generates hydrogen by using, for example, steam reforming that is one of methods for generating hydrogen. In the steam reforming, a hydrocarbon raw material (material gas), such as a natural gas, a propane gas, naphtha, gasoline and kerosene and water are mixed, or an alcohol material, such as methanol and water are mixed. Then, the mixture is supplied to a reformer including a reforming catalyst. In the reformer, a steam-reforming reaction proceeds, so that the hydrogen-containing gas containing hydrogen is generated.

The hydrogen-containing gas generated in the reformer of the hydrogen generator by the steam reforming contains carbon monoxide (CO) generated as a byproduct. For example, the hydrogen-containing gas generated in the reformer of the hydrogen generator contains carbon monoxide at a concentration of about 10% to 15%. Carbon monoxide contained in the hydrogen-containing gas significantly poisons the electrode catalyst of the polymer electrolyte fuel cell. The poisoning of the electrode catalyst significantly deteriorates an electric power generating performance of the polymer electrolyte fuel cell. Therefore, in the conventional hydrogen generator, in addition to the reformer for generating the hydrogen-containing gas, a CO reducer is disposed in many cases to adequately reduce the concentration of carbon monoxide in the hydrogen-containing gas. The concentration of carbon monoxide in the hydrogen-containing gas generated in the reformer is reduced by the CO reducer up to 100 ppm or less, and preferably 10 ppm or less. The hydrogen-containing gas whose carbon monoxide is adequately removed is supplied to the fuel cell of the fuel cell system in the electric power generating operation. With this, the poisoning of the electrode catalyst is prevented in the polymer electrolyte fuel cell.

The CO reducer constituting the hydrogen generator usually includes a shift converter which causes a water gas shift reaction to proceed at a shift catalyst disposed therein to generate hydrogen and carbon dioxide from carbon monoxide and steam. The CO reducer further includes a purifier which is disposed downstream of the shift converter and has at least one of an oxidation catalyst which causes an oxidation between oxygen in the air and carbon monoxide to proceed and a methanation catalyst which causes a methanation of carbon monoxide to proceed. Using the shift converter and the purifier, the CO reducer reduces the concentration of carbon monoxide in the hydrogen-containing gas generated in the reformer up to 100 ppm or less.

The natural gas supplied to the reformer of the hydrogen generator as a raw material usually contains a slight amount of nitrogen. The concentration of nitrogen differs depending on, for example, areas where the natural gas is supplied. In a case where the natural gas containing nitrogen is supplied to the reformer of the hydrogen generator during the electric power generating operation of the fuel cell system, a chemical reaction between hydrogen generated through the steam-reforming reaction and nitrogen proceeds in the reforming catalyst included in the reformer, and as a result, ammonia may be generated. It is known that ammonia is a chemical substance which significantly deteriorates the electric power generating performance of the polymer electrolyte fuel cell. Therefore, in the case of carrying out the electric power generating operation of the fuel cell system, if the natural gas is used as the raw material and thereby ammonia is generated at a high concentration, ammonia contained in the hydrogen-containing gas generated in the hydrogen generator needs to be removed before the hydrogen-containing gas is supplied to the polymer electrolyte fuel cell.

Proposed is a fuel cell system in which an ammonia remover is disposed upstream of the polymer electrolyte fuel cell, which removes ammonia contained in the hydrogen-containing gas, and the hydrogen-containing gas whose ammonia is removed is supplied to the polymer electrolyte fuel cell (see Patent Document 1 for example).

Patent Document 1: Japanese Laid-Open Patent Application Publication 2003-31247

DISCLOSURE OF THE INVENTION

Problems to be Solved by the Invention

In accordance with the configuration of the conventional fuel cell system including the ammonia remover, it is possible to prevent the electric power generating performance of the polymer electrolyte fuel cell from deteriorating due to ammonia. However, since ammonia generated in the reformer is removed after it has passed through the purifier, the oxidation catalyst disposed in the purifier may be poisoned by ammonia depending on the type of the catalyst. The poisoning of the oxidation catalyst by ammonia significantly deteriorates a carbon monoxide removing capability of the purifier. This becomes a cause of poisoning the electrode catalyst in the polymer electrolyte fuel cell by the carbon monoxide. The poisoning of the electrode catalyst by the carbon monoxide significantly deteriorates the electric power generating performance of the polymer electrolyte fuel cell as compared to the deterioration of the electric power generating performance by ammonia.

To be specific, as described above, in a case where ammonia is generated on the reforming catalyst of the reformer, and the oxidation catalyst of the purifier contains metal which is poisoned by ammonia, the poisoning of the oxidation catalyst proceeds as an operating time of the hydrogen generator increases, and therefore stable electric power cannot be obtained from the fuel cell system only by removing ammonia from the hydrogen-containing gas by the ammonia remover before supplying the hydrogen-containing gas to the polymer electrolyte fuel cell.

As a configuration of preventing the electric power generating performance from deteriorating due to ammonia and preventing the oxidation catalyst of the purifier from being poisoned by ammonia, a configuration of disposing the ammonia remover between the reformer and the purifier in the hydrogen generator is contemplated. However, in accordance with such configuration, the configuration of the hydrogen generator becomes very complex, so that it becomes difficult to provide inexpensive fuel cell systems.

Therefore, there is a need for a fuel cell system capable of suppressing significant deterioration of the electric power generating performance due to the poisoning of the oxidation catalyst by ammonia generated in the reformer of the hydrogen generator without disposing the ammonia remover and of stably supplying electric power for a long period of time.

The present invention was made to solve problems of the conventional fuel cell system, and an object of the present invention is to provide a hydrogen generator capable of stably supplying for a long period of time a high-quality hydrogen-containing gas whose carbon monoxide is adequately reduced in concentration even if the hydrogen generator is configured such that a nitrogen-containing compound, such as nitrogen, is supplied thereto during a reforming reaction and an oxidation catalyst of a purifier thereof is poisoned by generated ammonia, to provide a fuel cell system capable of stably supplying electric power by supplying the hydrogen-containing gas from the hydrogen generator thereof to a fuel cell thereof, and to provide their operating methods.

Means for Solving the Problems

To solve the above conventional problems, a hydrogen generator of the present invention includes: a reformer which is supplied with a raw material to generate a hydrogen-containing gas through a reforming reaction; a first gas supplying unit which supplies a gas containing a nitrogen-containing compound to the reformer; a CO remover which includes an oxidation catalyst containing a metal to be poisoned by ammonia and uses the oxidation catalyst and an oxidation gas to remove carbon monoxide in the hydrogen-containing gas by an oxidation; a second gas supplying unit which supplies the oxidation gas to the CO remover; and a control unit, wherein: the gas containing the nitrogen-containing compound is supplied from the first gas supplying unit to the reformer during the reforming reaction; and the control unit is configured to control to carry out a regeneration operation of the oxidation catalyst if a parameter related to a cumulative amount of ammonia supplied to the CO remover has reached a predetermined threshold or more.

In accordance with this configuration, since the control unit controls to carry out the regeneration operation of the oxidation catalyst if the parameter related to the cumulative amount of ammonia supplied to the CO remover has reached the predetermined threshold or more, the performance of the oxidation catalyst is preferably maintained for a long period of time. With this, it becomes possible to provide the hydrogen generator capable of stably supplying for a long period of time a high-quality hydrogen-containing gas whose carbon monoxide is adequately reduced.

In this case, the gas containing the nitrogen-containing compound is any one of the raw material containing the nitrogen-containing compound and air supplied to the reformer in a case where the reforming reaction is autothermal reforming or partial oxidation reforming.

In this case, the nitrogen-containing compound is any one of a nitrogen molecule, amine and isonitrile.

Moreover, in the above case, the control unit is configured to control to carry out the regeneration operation if a cumulative amount of the gas containing the nitrogen-containing compound supplied from the first gas supplying unit to the reformer has reached a predetermined threshold or more determined based on an upper limit of the cumulative amount of ammonia.

In accordance with this configuration, since the control unit controls to carry out the regeneration operation if the cumulative amount of the gas containing the nitrogen-containing compound supplied from the first gas supplying unit to the reformer has reached the predetermined threshold or more determined based on the upper limit of the cumulative amount of ammonia, it becomes possible to surely regenerate the oxidation catalyst in accordance with the cumulative amount of the gas containing the nitrogen-containing compound supplied to the reformer of the hydrogen generator.

Moreover, in the above case, the hydrogen generator further includes: an information acquisition device which acquires information related to a concentration of the nitrogen-containing compound in the gas containing the nitrogen-containing compound; and a threshold setting device which sets the predetermined threshold, wherein the threshold setting device is configured to set the predetermined threshold based on the information acquired by the information acquisition device.

In accordance with this configuration, since the hydrogen generator further includes the information acquisition device and the threshold setting device, and the threshold setting device is configured to set the predetermined threshold based on the information acquired by the information acquisition device, it becomes possible to easily carry out the regeneration operation of the oxidation catalyst in accordance with the concentration of the nitrogen-containing compound in the gas containing the nitrogen-containing compound.

In this case, the information is any one of information regarding the concentration of the nitrogen-containing compound, information regarding a type of the gas containing the nitrogen-containing compound, positional information and information regarding a supplier of the gas containing the nitrogen-containing compound.

In accordance with this configuration, since any of the information acquired by the information acquisition device is information closely related to the concentration of the nitrogen-containing compound in the gas containing the nitrogen-containing compound, it becomes possible to appropriately carry out the regeneration operation of the oxidation catalyst in accordance with the concentration of the nitrogen-containing compound in the gas containing the nitrogen-containing compound even in any area where the fuel cell system is delivered and even by any supplier of the gas containing the nitrogen-containing compound supplied to the fuel cell system.

Moreover, in the above case, the hydrogen generator further includes: a temperature detector which detects a temperature of the CO remover; and a temperature control unit which controls the temperature of the CO remover, wherein the control unit is configured to control the temperature control unit such that as the regeneration operation, the temperature of the CO remover detected by the temperature detector becomes higher than a control temperature that is a temperature before starting the regeneration operation or than a normal control temperature.

In accordance with this configuration, since the hydrogen generator further includes the temperature detector and the temperature control unit, and the control unit controls the temperature control unit such that the temperature of the CO remover detected by the temperature detector at the time of the regeneration operation becomes higher than the control temperature that is the temperature before starting the regeneration operation or than the normal control temperature, it becomes possible to surely remove a poison material from the oxidation catalyst by the reduction reaction. With this, it is possible to surely resolve the poisoning of the oxidation catalyst.

In this case, the hydrogen generator further includes a purge gas supplying unit for replacing a gas in a gas passage included in the hydrogen generator with a purge gas, wherein the control unit is configured to control the temperature control unit such that at a time of a stop operation of the hydrogen generator, as the regeneration operation, supply of the oxidation gas from the second gas supplying unit to the CO remover is stopped, and before starting supplying the purge gas from the purge gas supplying unit, the temperature of the CO remover detected by the temperature detector becomes higher than the control temperature that is before starting the regeneration operation or than the normal control temperature.

In accordance with this configuration, since the control unit controls the temperature control unit after a reducing atmosphere is realized inside the gas passage of the CO remover such that the temperature of the CO remover detected by the temperature detector at the time of the regeneration operation becomes higher than the control temperature that is the temperature before starting the regeneration operation or than the normal control temperature, it becomes possible to accelerate the reduction reaction on the oxidation catalyst, and also possible to surely remove the poison material from the oxidation catalyst by the reduction reaction.

Meanwhile, in the above case, the control unit is configured to control the second gas supplying unit such that at a time of a start-up operation of the hydrogen generator, as the regeneration operation, a timing for starting supplying the oxidation gas from the second gas supplying unit to the CO remover is later than the timing at a time of a normal start-up operation of the hydrogen generator.

In accordance with this configuration, since the reducing atmosphere is transiently realized inside the CO remover at the time of the start-up operation of the hydrogen generator, it becomes possible to easily resolve the poisoning of the oxidation catalyst.

Further, in the above case, the control unit is configured to control the second gas supplying unit such that at a time of a start-up operation of the hydrogen generator, as the regeneration operation, an amount of the oxidation gas supplied from the second gas supplying unit to the CO remover is smaller than the amount at a time of a normal operation.

Even in such configuration, since the reducing atmosphere is almost and transiently realized inside the CO remover at the time of the start-up operation of the hydrogen generator, it becomes possible to easily resolve the poisoning of the oxidation catalyst.

Moreover, in the above case, the control unit is configured to control to carry out the regeneration operation if a cumulative operating time of the hydrogen generator has reached a predetermined threshold or more determined based on an upper limit of the cumulative amount of ammonia.

Even in such configuration, since the control unit controls to carry out the regeneration operation if the cumulative operating time of the hydrogen generator has reached the predetermined threshold or more determined based on the upper limit of the cumulative amount of ammonia, it becomes possible to surely regenerate the oxidation catalyst.

Moreover, in the above case, the hydrogen generator further includes a water supplying unit which supplies water to the reformer, wherein the control unit is configured to control to carry out the regeneration operation if a cumulative amount of the water supplied from the water supplying unit to the reformer has reached a predetermined threshold or more determined based on an upper limit of the cumulative amount of ammonia.

Even in such configuration, since the control unit controls to carry out the regeneration operation if the cumulative amount of the water supplied from the water supplying unit to the reformer has reached the predetermined threshold or more determined based on the upper limit of the cumulative amount of ammonia, it becomes possible to surely regenerate the oxidation catalyst.

Moreover, in the above case, the control unit is configured to control to carry out the regeneration operation if a cumulative amount of the oxidation gas supplied from the second gas supplying unit to the CO remover has reached a predetermined threshold or more determined based on an upper limit of the cumulative amount of ammonia.

Even in such configuration, since the control unit controls to carry out the regeneration operation if the cumulative amount of the oxidation gas supplied from the second gas supplying unit to the CO remover has reached the predetermined threshold or more determined based on the upper limit of the cumulative amount of ammonia, it becomes possible to surely regenerate the oxidation catalyst.

Here, in any one of the above cases, the upper limit of the cumulative amount of ammonia is a cumulative amount of ammonia supplied to the CO remover until a concentration of carbon monoxide in the hydrogen-containing gas which has passed through the CO remover reaches a predetermined concentration at which the regeneration operation needs to be carried out.

Moreover, the upper limit of the cumulative amount of ammonia is a cumulative amount of ammonia supplied to the CO remover until a concentration of oxygen in the hydrogen-containing gas which has passed through the CO remover reaches a predetermined concentration at which the regeneration operation needs to be carried out.

In accordance with this configuration, since the upper limit of the cumulative amount of ammonia is the cumulative amount of ammonia supplied to the CO remover until the concentration of carbon monoxide or concentration of oxygen in the hydrogen-containing gas which has passed through the CO remover reaches the predetermined concentration at which the regeneration operation needs to be carried out, it becomes possible to carry out the regeneration operation of the oxidation catalyst at a more appropriate timing.

Meanwhile, to solve the above conventional problems, a fuel cell system according to the present invention includes: any one of the above hydrogen generators; and a fuel cell which is supplied with the hydrogen-containing gas generated by the hydrogen generator and an oxygen-containing gas to generate electric power.

In accordance with this configuration, since the fuel cell system includes the characteristic hydrogen generator according to the present invention, it becomes possible to provide the fuel cell system capable of stably supplying electric power for a long period of time.

Moreover, to solve the above conventional problems, a method for operating a hydrogen generator according to the present invention is a method for operating a hydrogen generator including: a reformer which is supplied with a raw material to generate a hydrogen-containing gas through a reforming reaction; a gas supplying unit which supplies a gas containing a nitrogen-containing compound to the reformer; and a CO remover which includes an oxidation catalyst containing Ru and uses the oxidation catalyst to remove carbon monoxide in the hydrogen-containing gas by an oxidation, wherein the gas containing the nitrogen-containing compound is supplied from the gas supplying unit to the reformer during the reforming reaction, the method including carrying out a regeneration operation of the oxidation catalyst if a parameter regarding a cumulative amount of ammonia supplied to the CO remover has reached a predetermined threshold or more determined based on an upper limit of the cumulative amount of ammonia.

In accordance with this configuration, since the regeneration operation of the oxidation catalyst is carried out if the parameter regarding the cumulative amount of ammonia supplied to the CO remover has reached the predetermined threshold or more determined based on the upper limit of the cumulative amount of ammonia, it becomes possible to stably obtain the high-quality hydrogen-containing gas by the hydrogen generator for a long period of time.

Moreover, to solve the above conventional problems, a method for operating a fuel cell system according to the present invention is a method for operating a fuel cell system including: a hydrogen generator having a reformer which is supplied with a raw material to generate a hydrogen-containing gas through a reforming reaction, a gas supplying unit which supplies a gas containing a nitrogen-containing compound to the reformer, and a CO remover which includes an oxidation catalyst containing Ru and uses the oxidation catalyst to remove carbon monoxide in the hydrogen-containing gas by an oxidation; and a fuel cell which is supplied with the hydrogen-containing gas generated by the hydrogen generator and an oxygen-containing gas to generate electric power, wherein the gas containing the nitrogen-containing compound is supplied from the gas supplying unit of the hydrogen generator to the reformer of the hydrogen generator during the reforming reaction, the method including carrying out a regeneration operation of the oxidation catalyst if a parameter regarding a cumulative amount of ammonia supplied to the CO remover has reached a predetermined threshold or more determined based on an upper limit of the cumulative amount of ammonia.

In accordance with this configuration, since the regeneration operation of the oxidation catalyst is carried out if the parameter regarding the cumulative amount of ammonia supplied to the CO remover included in the hydrogen generator has reached the predetermined threshold or more determined based on the upper limit of the cumulative amount of ammonia, it becomes possible to stably obtain desired electric power by the fuel cell system for a long period of time.

Effects of the Invention

In accordance with the hydrogen generator and its operating method according to the present invention, the ammonia poisoning of the oxidation catalyst which proceeds with time can be surely resolved. Therefore, even if the gas containing the nitrogen-containing compound is supplied to the hydrogen generator during the reforming reaction, and the generated ammonia is supplied to the oxidation catalyst, it is possible to stably supply for a long period of time a high-quality hydrogen-containing gas whose carbon monoxide is adequately reduced in concentration.

Moreover, in accordance with the fuel cell system and its operating method according to the present invention, it is possible to stably supply electric power for a long period of time since the fuel cell system includes the hydrogen generator capable of stably supplying the high-quality hydrogen-containing gas for a long period of time.

BRIEF DESCRIPTION OF THE DRAWINGS

FIG. 2($b$) is a schematic diagram schematically showing an estimated mechanism regarding how an oxidation catalyst included in a purifier is poisoned by ammonia.

FIG. 3($b$) is a schematic diagram schematically showing an estimated mechanism regarding how nitrosyl is removed as ammonia from the oxidation catalyst included in the purifier.

FIG. 7 is a correspondence diagram showing, for respective areas where a natural gas is supplied, relations between the concentration of nitrogen contained in the natural gas and the concentration of ammonia in the hydrogen-containing gas generated using the natural gas containing nitrogen.

FIG. 8 is a correspondence diagram schematically showing relations among nitrogen concentration related information related to the concentration of nitrogen in the natural gas, the concentration of nitrogen in the natural gas, a predetermined threshold, and a number to be input using an information acquisition device, which are prestored in a memory of a control device.

Figure 1:
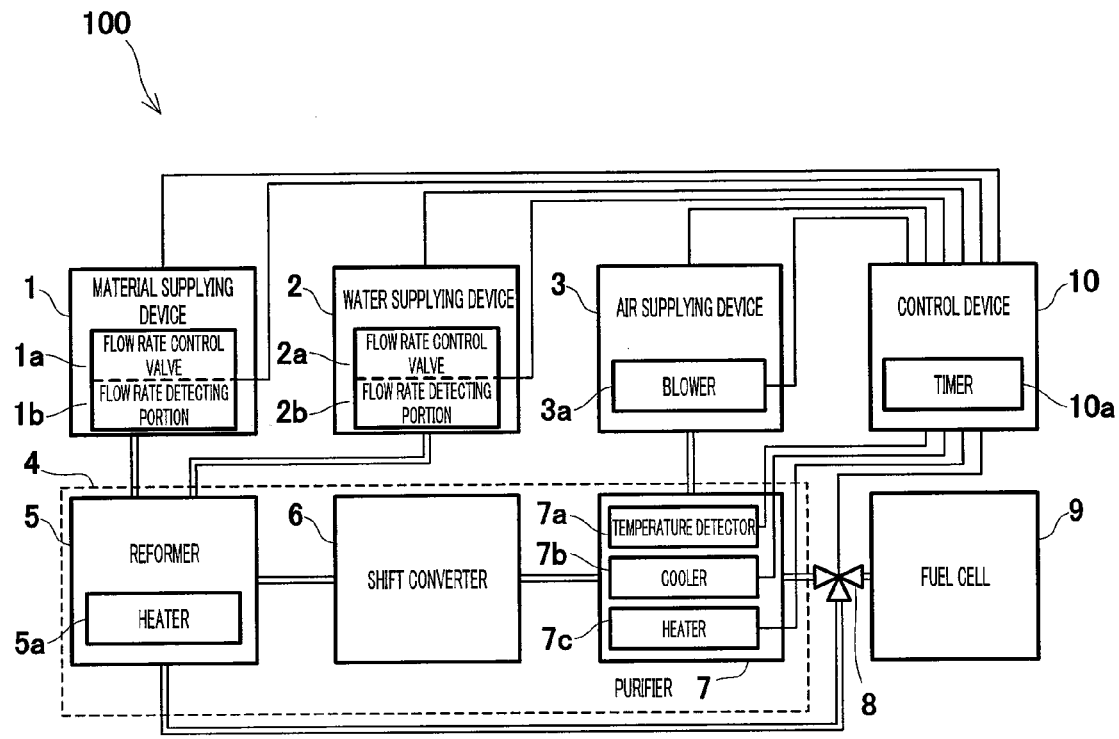
FIG. 1 is a block diagram schematically showing the configuration of a fuel cell system according to Embodiment 1 of the present invention.

EXPLANATION OF REFERENCE NUMBERS 1 material supplying device (first gas supplying unit)
1a flow rate control valve
1b flow rate detecting portion
2 water supplying device (water supplying unit)
2a flow rate control valve
2b flow rate detecting portion
3 air supplying device (second gas supplying unit)
3a blower
4 hydrogen generator
5 reformer
5a heater
6 shift converter
7 purifier (CO remover)
7a temperature detector
7b cooler
7c heater
8 passage switching valve
9 fuel cell
10 control device (control unit)
10a timer
11 catalyst support
12 Ru catalyst
13 oxidation catalyst body
14 threshold setting device
15 information acquisition device
100, 200 fuel cell system

BEST MODE FOR CARRYING OUT THE INVENTION

Hereinafter, the best mode for carrying out the present invention will be explained in detail in reference to the drawings.

Embodiment 1

First, the configuration of a fuel cell system 100 according to Embodiment 1 of the present invention will be explained in detail in reference to the drawings.

FIG. 1 is a block diagram schematically showing the configuration of the fuel cell system according to Embodiment 1 of the present invention. In FIG. 1, only components necessary for explaining the present invention are shown, and the other components are omitted.

The present embodiment exemplifies a case where a natural gas containing nitrogen is used as a material gas for generating a hydrogen-containing gas. In the present description, the material gases, typically the natural gas containing nitrogen, are collectively described as "a gas containing a nitrogen-containing compound". Note that the natural gas contains about several percent of nitrogen although the percentage differs depending on areas where the natural gas is supplied (areas where the material gas is supplied) and supply companies which supply the natural gas (suppliers which supply the material gas).

As shown in FIG. 1, the fuel cell system 100 according to Embodiment 1 of the present invention includes a material supplying device 1 which receives the natural gas as the material gas from an infrastructure of the natural gas and supplies the natural gas to a reformer 5 of a hydrogen generator 4 described below. The material supplying device 1 includes a flow rate control valve 1a. While suitably adjusting the amount of the natural gas supplied from the infrastructure of the natural gas to the reformer 5 by an operation of the flow rate control valve 1a, the material supplying device 1 supplies the natural gas as the material gas toward the reformer 5 of the hydrogen generator 4. The material supplying device 1 further includes a flow rate detecting portion 1b. The flow rate detecting portion 1b detects the flow rate of the natural gas supplied from the material supplying device 1 to the reformer 5 of the hydrogen generator 4. The flow rate detecting portion 1b outputs an electric signal corresponding to the flow rate of the natural gas. The flow rate control valve 1a is controlled based on the output signal of the flow rate detecting portion 1b. With this, the amount of the natural gas supplied from the material supplying device 1 to the reformer 5 of the hydrogen generator 4 is adjusted.

As shown in FIG. 1, the fuel cell system 100 further includes a water supplying device 2 which receives water from an infrastructure of water, such as plumbing, to generate steam, and supplies the water to the reformer 5 of the hydrogen generator 4. The water supplying device 2 includes a flow rate control valve 2a. While suitably adjusting the amount of the water supplied from the infrastructure of water, such as plumbing, to the reformer 5 by an operation of the flow rate control valve 2a, the water supplying device 2 supplies water for generating steam toward the reformer 5 of the hydrogen generator 4. The water supplying device 2 further includes a flow rate detecting portion 2b. The flow rate detecting portion 2b detects the flow rate of water supplied from the water supplying device 2 toward the reformer 5 of the hydrogen generator 4. Then, the flow rate detecting portion 2b outputs an electric signal corresponding to the flow rate of the water. The flow rate control valve 2a is controlled based on the output signal of the flow rate detecting portion 2b. With this, the amount of the water supplied from the water supplying device 2 to the reformer 5 of the hydrogen generator 4 is adjusted.

As shown in FIG. 1, the fuel cell system 100 further includes an air supplying device 3 which receives air as a supply source of oxygen from the atmosphere and supplies the air to a purifier 7 that is a CO remover (will be described later) according to the present invention. The air supplying device 3 includes a blower 3a. While suitably adjusting the amount of the air supplied from the atmosphere to the purifier 7, the blower 3a controlled by a control device 10 (will be described later) supplies the air as the supply source of oxygen toward the purifier 7 of the hydrogen generator 4.

The fuel cell system 100 further includes the hydrogen generator 4 having the reformer 5, the purifier 7 and a shift converter 6.

Specifically, as shown in FIG. 1, the hydrogen generator 4 includes the reformer 5. The reformer 5 is supplied with the natural gas as the material gas from the material supplying device 1 and the water for generating steam from the water supplying device 2 and causes the reforming catalyst not shown in FIG. 1 to proceed a steam-reforming reaction to thereby generate the hydrogen-containing gas containing hydrogen. When the hydrogen-containing gas is generated by the reformer 5, the reforming catalyst included in the reformer 5 is heated up to and kept at a temperature suitable for the progress of the steam-reforming reaction. The reforming catalyst is heated up to and kept at the temperature by using, for example, heat energy generated by combustion of fuel. Therefore, as shown in FIG. 1, the reformer 5 of the hydrogen generator 4 includes a heater 5a. The heater 5a generates the heat energy by burning, for example, part of the natural gas supplied as the material gas, the hydrogen-containing gas which is discharged from the hydrogen generator 4 and whose carbon monoxide is not adequately removed, or an excessive hydrogen-containing gas which is discharged from a fuel cell 9 (will be described later) and has not been used for generating electric power. The heat energy generated by the heater 5a allows the reforming catalyst of the reformer 5 to be heated up to and kept at the temperature suitable for the progress of the steam-reforming reaction. With this, the reformer 5 generates the hydrogen-containing gas.

In the present embodiment, a transition metal catalyst made of Ru is used as the reforming catalyst of the reformer 5. In this case, when generating the hydrogen-containing gas, the reforming catalyst of the reformer 5 is heated by the heater 5a up to 600° C. to 700° C. Then, when generating the hydrogen-containing gas, the reforming catalyst of the reformer 5 is kept at 600° C. to 700° C. by the heater 5a. With this, the reformer 5 generates the hydrogen-containing gas containing hydrogen as a major component. The present embodiment exemplifies the case where the transition metal catalyst made of Ru is used as the reforming catalyst of the reformer 5. However, the reforming catalyst of the reformer 5 is not limited to this, and for example, the transition metal catalyst made of Ni may be used as the reforming catalyst of the reformer 5. Even in such case, same effects can be obtained since the catalysis of Ni and the catalysis of Ru are similar to each other. Moreover, in the present embodiment, the heater 5a includes a combustion burner. By supplying the fuel to the combustion burner, the heater 5a burns the supplied fuel to generate the heat energy.

As shown in FIG. 1, the hydrogen generator 4 further includes the shift converter 6 disposed downstream of the reformer 5 in a direction in which the hydrogen-containing gas generated by the reformer 5 is supplied. The shift converter 6 is supplied with the hydrogen-containing gas from the reformer 5, and causes the shift catalyst not shown in FIG. 1 to proceed a water gas shift reaction to reduce the concentration of carbon monoxide in the hydrogen-containing gas. When reducing the concentration of carbon monoxide in the hydrogen-containing gas, the shift catalyst included in the shift converter 6 is heated up to and kept at a temperature suitable for the progress of the water gas shift reaction. The shift catalyst is heated up to and kept at the temperature by, for example, the high-temperature hydrogen-containing gas supplied from the reformer 5. Therefore, in the present embodiment, as shown in FIG. 1, the shift converter 6 of the hydrogen generator 4 does not include a heater equivalent to the heater 5a included in the reformer 5. In the present embodiment, the high-temperature hydrogen-containing gas supplied from the reformer 5 allows the shift catalyst of the shift converter 6 to be heated up to and kept at a temperature suitable for the progress of the water gas shift reaction. With this, the shift converter 6 reduces the concentration of carbon monoxide in the hydrogen-containing gas generated by the reformer 5.

In the present embodiment, a transition metal catalyst made of Pt is used as the shift catalyst of the shift converter 6. In this case, when reducing the concentration of carbon monoxide in the hydrogen-containing gas, the shift catalyst of the shift converter 6 is heated by the high-temperature hydrogen-containing gas supplied from the reformer 5 up to about 200° C. to 300° C. Then, when reducing the concentration of carbon monoxide in the hydrogen-containing gas, the shift catalyst of the shift converter 6 is kept at about 200° C. to 300° C. by the high-temperature hydrogen-containing gas supplied from the reformer 5. With this, the shift converter 6 reduces the concentration of carbon monoxide in the hydrogen-containing gas generated by the reformer 5 up to about 0.3% from about 10% to 15% by the water gas shift reaction of carbon monoxide and steam. The present embodiment exemplifies the case where the transition metal catalyst made of Pt is used as the shift catalyst of the shift converter 6. However, the shift catalyst of the shift converter 6 is not limited to this, and for example, a catalyst containing Cu—Zn may be used as the shift catalyst of the shift converter 6. Even in such case, same effects can be obtained since the catalysis of Cu—Zn and the catalysis of Pt are similar to each other.

As shown in FIG. 1, the hydrogen generator 4 further includes the purifier 7 disposed downstream of the shift converter 6 in a direction in which the hydrogen-containing gas whose carbon monoxide is reduced in concentration in the shift converter 6 is supplied. The purifier 7 is supplied from the shift converter 6 with the hydrogen-containing gas whose carbon monoxide is reduced in concentration by the water gas shift reaction and is supplied from the air supplying device 3 with the air as the supply source of oxygen (oxidation gas) to further reduce the concentration of carbon monoxide in the hydrogen-containing gas supplied from the shift converter 6 by the progress of the oxidation caused by a purified catalyst (oxidation catalyst in the present embodiment) not shown in FIG. 1. When further reducing the concentration of carbon monoxide in the hydrogen-containing gas, the oxidation catalyst included in the purifier 7 is heated up to and kept at a temperature suitable for the progress of the oxidation. The oxidation catalyst is heated up to and kept at the temperature by, for example, the high-temperature hydrogen-containing gas supplied from the shift converter 6 or reaction heat generated when the oxidation proceeds. As shown in FIG. 1, the purifier 7 includes a temperature detector 7a which detects at least one of the temperature of the oxidation catalyst and the temperature inside the purifier 7. The temperature detector 7a includes a temperature detecting element, such as a thermistor. The temperature detecting element, such as thermistor, is disposed at a predetermined position, such as an inside or a surface of the oxidation catalyst, or an inside of the purifier 7. In the temperature detector 7a, for example, an electrical resistance of the thermistor changes depending on the temperature of the oxidation catalyst, the temperature of the hydrogen-containing gas flowing inside the purifier 7, and the like. Based on the changes of the electrical resistance of the thermistor included in the temperature detector 7a, the oxidation catalyst included in the purifier 7 is heated up to and kept at a temperature suitable for the progress of the oxidation. With this, the purifier 7 further reduces the concentration of carbon monoxide in the hydrogen-containing gas which is generated by the shift converter 6 and whose carbon monoxide is reduced in concentration.

The oxidation catalyst of the purifier 7 may deteriorate by supplying the air from the air supplying device 3 to the purifier 7 when the oxidation catalyst of the purifier 7 is heated up to and kept at a temperature suitable for the progress of the oxidation, which will be described later. Therefore, as shown in FIG. 1, in the fuel cell system 100 according to the present embodiment, the purifier 7 includes a cooler 7b and a heater 7c to appropriately control the temperature of the oxidation catalyst. By appropriately driving the cooler 7b and the heater 7c, the oxidation catalyst can be heated up to and kept at a temperature suitable for the progress of the oxidation without deteriorating the oxidation catalyst. Note that the cooler 7b and the heater 7c may be combined to constitute a temperature control unit.

In the present embodiment, the amount of the oxidation catalyst in the purifier 7 is 200 ml. Moreover, a transition metal catalyst made of Ru is used as the oxidation catalyst of the purifier 7. In this case, when further reducing the concentration of carbon monoxide in the hydrogen-containing gas, the oxidation catalyst of the purifier 7 is heated by, for example, the high-temperature hydrogen-containing gas supplied from the shift converter 6 up to about 100° C. to 200° C. With this, the purifier 7 reduces the concentration of carbon monoxide in the hydrogen-containing gas, whose carbon monoxide is reduced in concentration by the shift converter 6, up to 10 ppm or less from about 0.3% by the oxidation in which carbon monoxide is oxidized by oxygen as the oxidation gas.

The present embodiment exemplifies the case where the transition metal catalyst made of Ru is used as the oxidation catalyst of the purifier 7. However, the oxidation catalyst of the purifier 7 is not limited to this, and the transition metal catalyst made of, for example, Pt or Rh may be used as the oxidation catalyst of the purifier 7. Even in such case, same effects can be obtained since the catalysis of Pt, Rh or the like and the catalysis of Ru are similar to each other. Note that the catalysis of Pt does not deteriorate so much as compared to the catalysis of Ru or Rh. Therefore, it may be unnecessary to carry out the present invention in the case of using the transition metal catalyst made of Pt as the oxidation catalyst of the purifier 7.

The present embodiment exemplifies the case where the purifier 7 includes the oxidation catalyst, and the oxidation proceeds by the oxidation catalyst. However, the present embodiment is not limited to this. For example, the present embodiment may exemplify a case where the purifier 7 includes a methanation catalyst as the purified catalyst, and the concentration of carbon monoxide in the hydrogen-containing gas is reduced by causing the methanation to proceed by the methanation catalyst. Alternatively, the present embodiment may exemplify a case where the purifier 7 includes both the oxidation catalyst and the methanation catalyst, and the concentration of carbon monoxide in the hydrogen-containing gas is reduced by causing the oxidation and the methanation to proceed simultaneously by these two catalysts. However, in the case where the purifier 7 includes the methanation catalyst, and the carbon monoxide in the hydrogen-containing gas is reduced by the methanation, the purified catalyst comparatively does not deteriorate so much since it is unnecessary to supply oxygen to the purifier 7. Therefore, it may be unnecessary to carry out the present invention in the case where the purifier 7 includes the methanation catalyst.

As shown in FIG. 1, the fuel cell system 100 includes a passage switching valve 8 disposed downstream of the purifier 7 in a direction in which the hydrogen-containing gas whose carbon monoxide is further reduced in concentration by the purifier 7 is supplied. The passage switching valve 8 is constituted of, for example, a three-way valve. The passage switching valve 8 suitably switches a destination, to which the hydrogen-containing gas which is generated by the hydrogen generator 4 and whose carbon monoxide is adequately reduced in concentration is supplied, between the fuel cell 9 (will be described later) and the heater 5a of the reformer 5 of the hydrogen generator 4.

The fuel cell system 100 includes the fuel cell 9 as a main body of an electric power generating portion. In the present embodiment, for example, a polymer electrolyte fuel cell is used as the fuel cell 9. In the polymer electrolyte fuel cell, the hydrogen-containing gas which is generated by the hydrogen generator 4 and whose carbon monoxide is adequately reduced in concentration is supplied to its anode, and the air (oxygen-containing gas) containing oxygen as an oxidation gas is supplied from the atmosphere to its cathode. Then, the polymer electrolyte fuel cell outputs predetermined electric power by the progress of a predetermined electrochemical reaction carried out on respective electrode catalysts. Other than the polymer electrolyte fuel cell, for example, a phosphoric acid fuel cell can be used as the fuel cell 9. Since the operating temperature of the phosphoric acid fuel cell during the electric power generating operation is low as compared with those of the other fuel cells, the phosphoric acid fuel cell is preferably used as the fuel cell 9 constituting the fuel cell system 100 as with the polymer electrolyte fuel cell.

The fuel cell system 100 further includes the control device 10 which suitably controls operations of components constituting the fuel cell system 100. The control device 10 includes, for example, a central processing unit (CPU) and a memory, which are not shown in FIG. 1.

The control device 10 is configured to be able to suitably detect, for example, a cumulative amount of the material gas supplied from the material supplying device 1 to the reformer 5 of the hydrogen generator 4, a cumulative amount of the water supplied from the water supplying device 2 to the reformer 5 of the hydrogen generator 4, and a cumulative amount of the air supplied from the air supplying device 3 to the purifier 7 based on, for example, the output signal of the flow rate detecting portion 1b of the material supplying device 1, the output signal of the flow rate detecting portion 2b of the water supplying device 2, and the drive signal of the blower 3a of the air supplying device 3. In addition, the control device 10 is configured to be able to detect a cumulative amount of the electric power generated by the fuel cell 9, based on the output signal of, for example, an inverter (not shown in FIG. 1) included in the fuel cell system 100.

As shown in FIG. 1, the control device 10 includes a timer 10a. The timer 10a measures, according to need, continuous operating times and cumulative operating times of components of the fuel cell system 100, the hydrogen generator 4 and the like, elapsed times in cases where processing instructions prestored in the memory are executed, and the like.

Although not shown in FIG. 1, the control device 10 further includes a setting portion for setting various predetermined thresholds (for example, the continuous operating times and cumulative operating times of the fuel cell system 100 and the hydrogen generator 4, the cumulative amount of the material gas supplied from the material supplying device 1 to the hydrogen generator 4, the cumulative amount of the electric power generated by the fuel cell 9, and predetermined thresholds for predetermined parameters, typically the number of times of the start or stop of the fuel cell system 100, etc.). A program for operations of respective components of the fuel cell system 100 is prestored in the memory of the control device 10. The control device 10 suitably controls the operations of the fuel cell system 100 based on the program prestored in the memory.

As shown in FIG. 1, the components constituting the fuel cell system 100 are connected to one another by predetermined connection pipes, wiring materials, and the like.

Next, operations of the fuel cell system 100 according to Embodiment 1 of the present invention will be explained in detail in reference to the drawings. The present embodiment exemplifies a case where the natural gas is supplied from the material supplying device 1 to the reformer 5 of the hydrogen generator 4 at a rate of 4 NL/min.

When the fuel cell system 100 is started by the control device 10 or an operator of the fuel cell system 100, the control device 10 controls the operations of the fuel cell system 100 such that a predetermined preparing operation for starting the electric power generating operation of the fuel cell 9 is carried out.

When the control device 10 detects that the temperature of the reforming catalyst of the reformer 5 has reached a predetermined temperature after the predetermined preparing operation for starting the electric power generating operation of the fuel cell 9, the control device 10 controls such that a predetermined amount of the natural gas as the material gas is supplied from the material supplying device 1 to the reformer 5 of the hydrogen generator 4. As well as starting supplying the natural gas from the material supplying device 1 to the reformer 5 of the hydrogen generator 4, the control device 10 controls such that a predetermined amount of the water is supplied from the water supplying device 2 toward the reformer 5 of the hydrogen generator 4. In the reformer 5 of the hydrogen generator 4, the natural gas and the water are supplied onto the reforming catalyst included in the reformer 5, and the steam-reforming reaction using the natural gas and steam proceeds on the reforming catalyst of the reformer 5. Thus, the hydrogen-containing gas containing hydrogen is generated. The high-temperature hydrogen-containing gas generated by the reformer 5 is pushed out by the natural gas continuously supplied from the material supplying device 1 to the reformer 5 and is supplied to the shift converter 6 and the purifier 7, in this order, disposed downstream of the reformer 5. While the hydrogen-containing gas generated by the reformer 5 heats the shift catalyst of the shift converter 6 and the oxidation catalyst of the purifier 7, the concentration of carbon monoxide in the hydrogen-containing gas is gradually reduced by the water gas shift reaction and the oxidation which proceed in accordance with the increase in temperature of the shift catalyst and the oxidation catalyst, and then the hydrogen-containing gas is discharged from the hydrogen generator 4. In this case, the control device 10 controls the operation of the blower 3a such that a predetermined amount of oxygen is supplied as the oxidation gas from the air supplying device 3 to the purifier 7 of the hydrogen generator 4. With this, the oxidation by the oxidation catalyst proceeds in the purifier 7 of the hydrogen generator 4.

The hydrogen-containing gas discharged from the hydrogen generator 4 contains carbon monoxide at high concentration until the temperature of the shift catalyst of the shift converter 6 of the hydrogen generator 4 and the temperature of the oxidation catalyst of the purifier 7 of the hydrogen generator 4 reach predetermined temperatures. In the fuel cell system 100, the control device 10 controls the passage switching valve 8, so that the hydrogen-containing gas generated by the hydrogen generator 4 is not supplied to the fuel cell 9 but is supplied to the heater 5a of the reformer 5 of the hydrogen generator 4. Then, the heater 5a of the reformer 5 uses the hydrogen-containing gas, whose carbon monoxide is not adequately reduced in concentration, as the fuel to heat the reforming catalyst of the reformer 5 and keep the temperature of the reforming catalyst.

After that, when operating temperatures of the reformer 5, shift converter 6 and purifier 7 of the hydrogen generator 4 reach respective predetermined operating temperatures, the control device 10 controls the passage switching valve 8 to stop supplying the hydrogen-containing gas from the hydrogen generator 4 to the heater 5a. Then, the control device 10 controls the passage switching valve 8 to start supplying the hydrogen-containing gas from the hydrogen generator 4 to the fuel cell 9. Simultaneously, the control device 10 controls to supply the air containing oxygen as the oxidation gas from the atmosphere to the fuel cell 9. With this, the fuel cell 9 starts the electric power generating operation.

The natural gas used as the material gas for generating the hydrogen-containing gas may contain a slight amount of nitrogen (nitrogen gas) as a nitrogen-containing compound. When the natural gas containing nitrogen is supplied to the reformer 5 of the hydrogen generator 4 in the electric power generating operation of the fuel cell system 100, the chemical reaction between hydrogen generated through the steam-reforming reaction and nitrogen proceeds in the reforming catalyst included in the reformer 5, and as a result, ammonia may be generated. It is known that ammonia is a chemical substance which deteriorates the electric power generating performance of the polymer electrolyte fuel cell.

The present embodiment exemplifies an embodiment in which the natural gas containing nitrogen at a concentration of about 3% is supplied from the material supplying device 1 to the reformer 5 of the hydrogen generator 4. In this case, as shown in FIG. 7 (will be described later), after starting the electric power generating operation of the fuel cell 9, the reformer 5 of the hydrogen generator 4 generates about 5 ppm ammonia from nitrogen contained at a concentration of about 3% and hydrogen generated through the steam-reforming reaction. That is, in a case where the electric power generating operation of the fuel cell system 100 is started, about 5 ppm of ammonia is supplied from the reformer 5 toward the purifier 7 in the hydrogen generator 4 at all times. In a case where the hydrogen-containing gas containing ammonia is supplied from the reformer 5 to the purifier 7, the poisoning of the oxidation catalyst in the purifier 7 proceeds with time. Moreover, it is known that in a case where the hydrogen-containing gas containing ammonia is supplied to the fuel cell 9, the output voltage of the fuel cell 9 decreases with time as compared to a case where the electric power is generated using the hydrogen-containing gas not containing ammonia.

Hereinafter, time-lapse changes of the concentration of carbon monoxide and concentration of ammonia in the hydrogen-containing gas discharged from the hydrogen generator 4 and time-lapse changes of the output voltage of the fuel cell 9, after starting the electric power generating operation of the fuel cell 9, will be explained in detail in reference to the drawings.

Figure 2A:
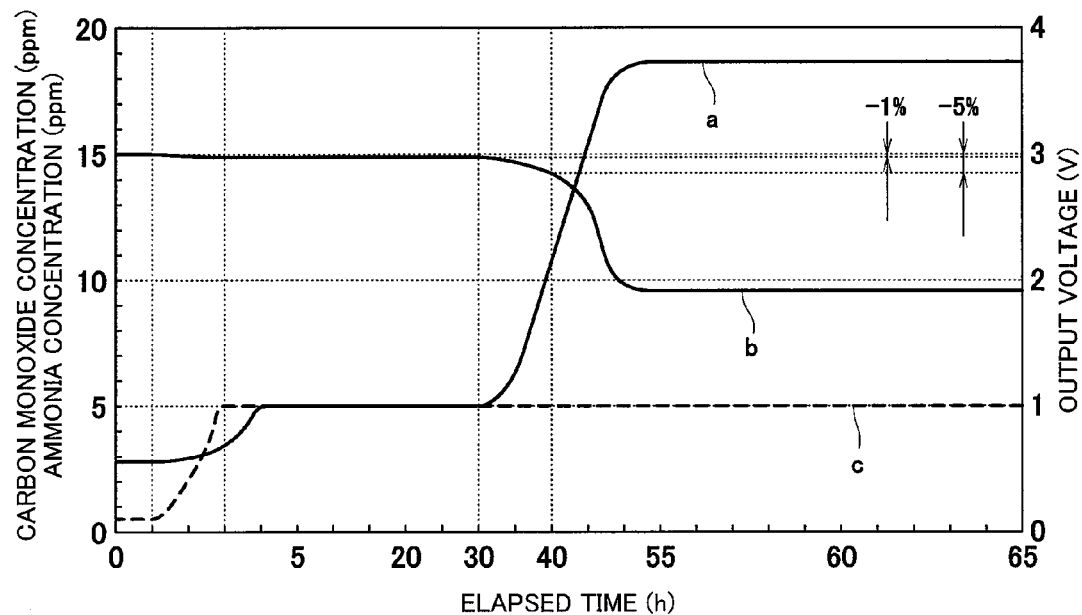
FIG. 2($a$) is a time chart schematically showing time-lapse changes of the carbon monoxide concentration and ammonia concentration of a hydrogen-containing gas discharged from a hydrogen generator and time-lapse changes of an output voltage of a fuel cell, after starting the electric power generating operation of the fuel cell.

FIG. 2(a) is a time chart schematically showing the time-lapse changes of the carbon monoxide concentration and ammonia concentration of the hydrogen-containing gas discharged from the hydrogen generator and the time-lapse changes of the output voltage of the fuel cell, after starting the electric power generating operation of the fuel cell.

In FIG. 2(a), a left-side vertical axis denotes the carbon monoxide concentration (ppm) or the ammonia concentration (ppm), a right-side vertical axis denotes the output voltage (V) of the fuel cell, and a horizontal axis denotes an elapsed time (h). For convenience, the horizontal axis of FIG. 2(a) is marked in 5 h increments in a range from 5 h to 55 h and in 1 h increments in the other range. In FIG. 2(a), a curve a denotes the time-lapse changes of the carbon monoxide concentration, a curve b denotes the time-lapse changes of the output voltage of the fuel cell, and a curve c denotes the time-lapse changes of the ammonia concentration.

As shown in FIG. 2(a), for about an hour (elapsed time 0 h to 1 h) elapsed since start of the electric power generating operation of the fuel cell 9 at the elapsed time 0 h, a good-quality hydrogen-containing gas whose ammonia concentration is reduced up to less than 1 ppm is discharged from the hydrogen generator 4. Moreover, good-quality hydrogen-containing gas whose carbon monoxide concentration is reduced up to about 3 ppm is discharged from the hydrogen generator 4. Therefore, in the fuel cell system 100, the voltage drop of the output voltage of the fuel cell 9 does not occur for about an hour elapsed since the start of the electric power generating operation of the fuel cell 9.

However, after about an hour elapsed since the start of the electric power generating operation of the fuel cell 9, the ammonia concentration of the hydrogen-containing gas discharged from the hydrogen generator 4 gradually increases. Moreover, since the poisoning of the oxidation catalyst by ammonia gradually proceeds in the purifier 7, the carbon monoxide concentration of the hydrogen-containing gas discharged from the hydrogen generator 4 moderately increases. As a result, as shown in FIG. 2(*a*), after about an hour elapsed since the start of the electric power generating operation of the fuel cell 9 in the fuel cell system 100, the voltage drop of the output voltage of the fuel cell 9 occurs.

Figure 2B:
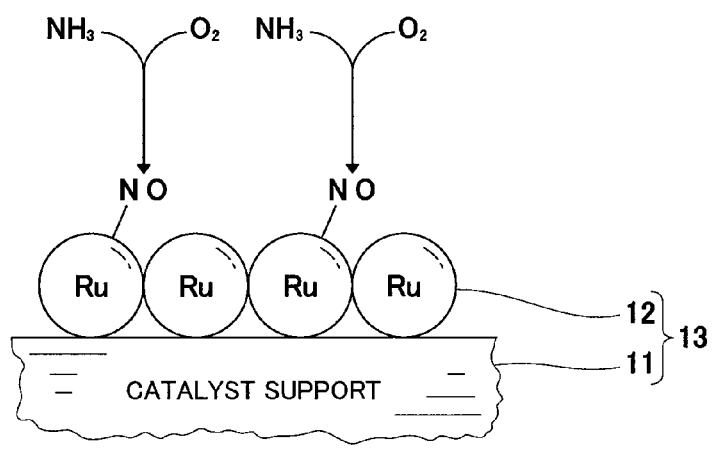

As shown in FIG. 2(*a*), in the present embodiment, at the time about three hours have elapsed since the start of the electric power generating operation of the fuel cell 9, the ammonia concentration of the hydrogen-containing gas discharged from the hydrogen generator 4 has increased up to about 5 ppm. Moreover, the carbon monoxide concentration of the hydrogen-containing gas discharged from the hydrogen generator 4 has increased up to about 3.5 ppm. As a result, in the fuel cell system 100, the output voltage of the fuel cell 9 decreases about 1%. However, after about three hours elapsed since the start of the electric power generating operation of the fuel cell 9, the ammonia concentration of the hydrogen-containing gas discharged from the hydrogen generator 4 does not increase any more. Meanwhile, for several tens of hours elapsed since the start of the increase in the carbon monoxide concentration of the hydrogen-containing gas, the carbon monoxide concentration of the hydrogen-containing gas discharged from the hydrogen generator 4 hovers at about 5 ppm. Therefore, as shown in FIG. 2(*a*), for several tens of hours elapsed since the start of the increase in the carbon monoxide concentration and ammonia concentration of the hydrogen-containing gas, the output voltage of the fuel cell 9 hovers with about 1% decrease.

As shown in FIG. 2(*a*), after about 40 hours elapsed since the start of the electric power generating operation of the fuel cell 9, the poisoning of the oxidation catalyst by ammonia further proceeds, so that the carbon monoxide concentration of the hydrogen-containing gas increases up to a concentration over 10 ppm although the ammonia concentration of the hydrogen-containing gas discharged from the hydrogen generator 4 hovers at a concentration of about 5 ppm. Therefore, at the time about 40 hours have elapsed since the start of the electric power generating operation of the fuel cell 9, the output voltage of the fuel cell 9 has decreased about 5%. After that, since the poisoning of the oxidation catalyst by ammonia further proceeds in the purifier 7, the carbon monoxide concentration of the hydrogen-containing gas discharged from the hydrogen generator 4 further increases in accordance with the degree of progress of the poisoning of the oxidation catalyst. As a result, in the fuel cell system 100, the output voltage of the fuel cell 9 further decreases.

An estimated mechanism regarding how the oxidation catalyst of the purifier 7 is poisoned by ammonia will be explained in reference to the drawings.

FIG. 2(*b*) is a schematic diagram schematically showing the estimated mechanism regarding how the oxidation catalyst of the purifier is poisoned by ammonia.

As shown in FIG. 2(*b*), in the purifier 7, a Ru catalyst 12 is disposed on a catalyst support 11, and the catalyst support 11 and the Ru catalyst 12 constitute an oxidation catalyst body 13. When the air containing oxygen as the oxidation gas is supplied from the air supplying device 3 to the purifier 7 in the progress of the oxidation, a chemical reaction, shown by Reaction Formula (1), between the oxygen and the ammonia contained in the hydrogen-containing gas supplied from the shift converter 6 disposed upstream of the purifier 7 proceeds on Ru. Nitrosyl (NO) is generated by this chemical reaction.

$$4NH_3 + 5O_2 \rightarrow 4NO + 6H_2O \qquad (1)$$

Nitrosyl generated by the progress of the chemical reaction shown by Reaction Formula (1) is adsorbed on Ru, and the oxidation catalyst body 13 is poisoned. With this, the oxidation catalyst of the purifier 7 loses its catalytic activity. The oxidation catalyst of the purifier 7 cannot activate the oxidation, and cannot reduce the carbon monoxide concentration of the hydrogen-containing gas.

It is not preferable to continue the electric power generating operation of the fuel cell system 100 in a state where the poisoning of the oxidation catalyst of the purifier 7 proceeds, and the carbon monoxide concentration of the hydrogen-containing gas supplied from the shift converter 6 of the hydrogen generator 4 cannot be reduced adequately (that is, in a state where the output voltage of the fuel cell 9 keeps on decreasing), since the power generation efficiency of the fuel cell 9 significantly deteriorates. Hovering of the output voltage of the fuel cell system 100 at a predetermined voltage value or less for a long period of time is a big problem in the use of the fuel cell system 100.

In the present embodiment, the control device 10 stops the electric power generating operation of the fuel cell 9 before the poisoning of the oxidation catalyst of the purifier 7 proceeds, and it becomes impossible to adequately reduce the carbon monoxide concentration of the hydrogen-containing gas supplied from the shift converter 6 of the hydrogen generator 4 in the fuel cell system 100. Then, in order to regenerate the oxidation catalyst of the purifier 7, the control device 10 controls to carry out regeneration process (regeneration operation) of the oxidation catalyst of the purifier 7.

Hereinafter, details of the regeneration process for regenerating the oxidation catalyst of the purifier 7, the time-lapse changes of the carbon monoxide concentration and ammonia concentration of the hydrogen-containing gas discharged from the hydrogen generator 4 in the case of carrying out the regeneration process, and the time-lapse changes of the output voltage of the fuel cell 9 in the case of carrying out the regeneration process will be explained.

FIG. 3(*a*) is a time chart schematically showing the time-lapse changes of the carbon monoxide concentration and ammonia concentration of the hydrogen-containing gas discharged from the hydrogen generator and the time-lapse changes of the output voltage of the fuel cell, after starting the electric power generating operation of the fuel cell.

As with FIG. 2(*a*), in FIG. 3(*a*), a left-side vertical axis denotes the carbon monoxide concentration (ppm) or the ammonia concentration (ppm), a right-side vertical axis denotes the output voltage (V) of the fuel cell, and a horizontal axis denotes the elapsed time (h). For convenience, the horizontal axis of FIG. 3(*a*) is marked in 5 h increments in a range from 5 h to 40 h and a range from 46 h to 81 h and in 1 h increments in the other range. In FIG. 3(*a*), a curve a denotes the time-lapse changes of the carbon monoxide concentration, a curve b denotes the time-lapse changes of the output voltage of the fuel cell, and a curve c denotes the time-lapse changes of the ammonia concentration.

Figure 4:
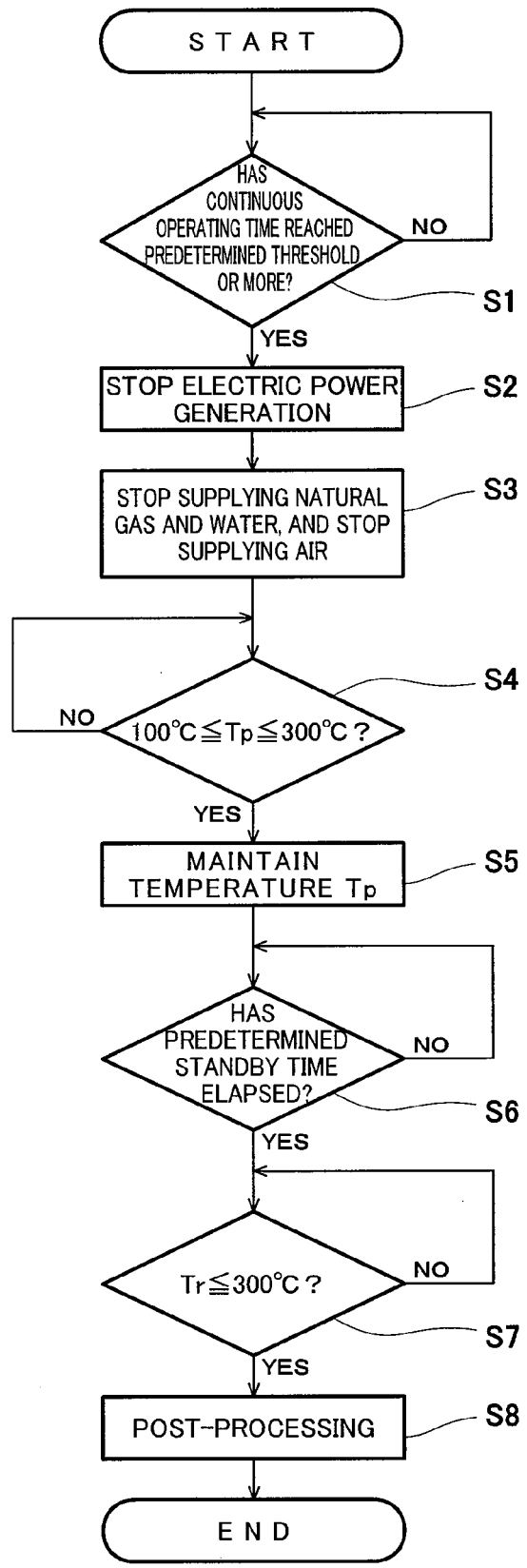
FIG. 4 is a flow chart schematically showing regeneration process of the oxidation catalyst according to Embodiment 1 of the present invention.

Moreover, FIG. 4 is a flow chart schematically showing the regeneration process of the oxidation catalyst according to Embodiment 1 of the present invention.

Figure 3A:
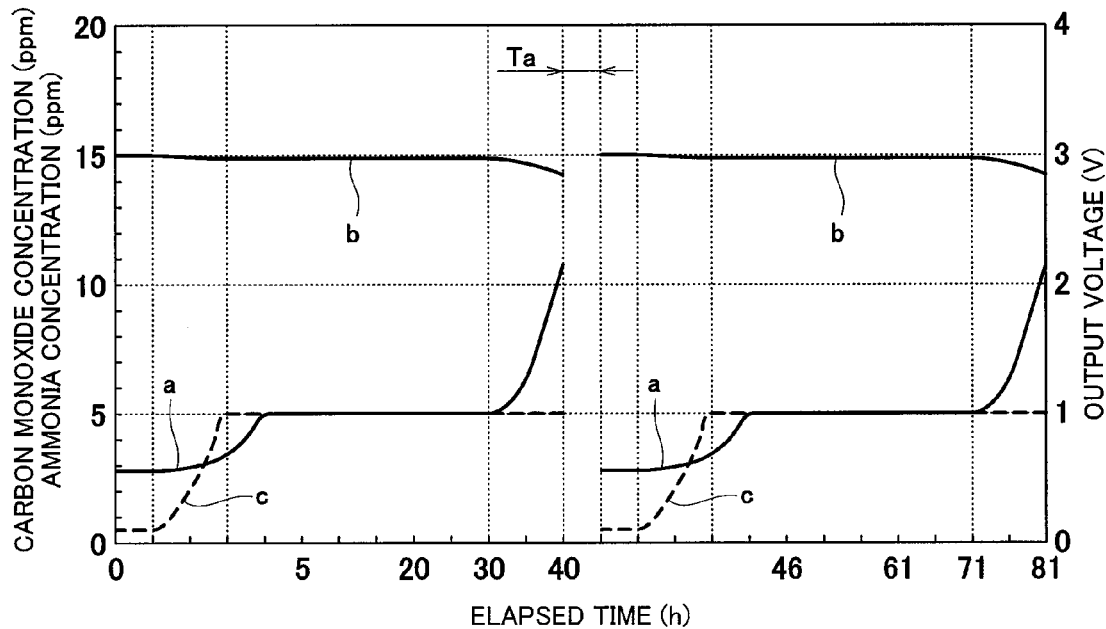
FIG. 3($a$) is a time chart schematically showing time-lapse changes of the carbon monoxide concentration and ammonia concentration of the hydrogen-containing gas discharged from the hydrogen generator and time-lapse changes of the output voltage of the fuel cell, after starting the electric power generating operation of the fuel cell.

As shown in FIG. 3(a), since the poisoning of the oxidation catalyst of the purifier 7 does not substantially proceed for about an hour (elapsed time of 0 h to 1 h) elapsed since the start of the electric power generating operation of the fuel cell system 100, the hydrogen generator 4 supplies to the fuel cell 9 the good-quality hydrogen-containing gas whose ammonia concentration and carbon monoxide concentration are reduced up to predetermined concentrations or less. Therefore, the fuel cell 9 outputs electric power at a predetermined output voltage.

However, after about an hour elapsed since the start of the electric power generating operation of the fuel cell 9, the poisoning of the oxidation catalyst in the purifier 7 by ammonia proceeds with time. Therefore, the ammonia concentration of the hydrogen-containing gas discharged from the hydrogen generator 4 increases up to about 5 ppm. Moreover, the carbon monoxide concentration of the hydrogen-containing gas discharged from the hydrogen generator 4 hovers at about 5 ppm for several tens of hours, and then increases with time. As a result, as shown in FIG. 3(a), in the fuel cell system 100, the output voltage of the fuel cell 9 hovers with about 1% decrease for several tens of hours after about an hour elapsed since the start of the electric power generating operation of the fuel cell 9, and then decreases with time.

In the present embodiment, in order to carry out the above-described regeneration operation before the carbon monoxide concentration of the hydrogen-containing gas discharged from the hydrogen generator 4 increases significantly up to a concentration over 10 ppm, the control device 10 controls the passage switching valve 8 to stop supplying the hydrogen-containing gas, so that the electric power generating operation of the fuel cell 9 is stopped. In the present embodiment, a threshold of the continuous operating time which is a time from the start to stop of the operation of the fuel cell system 100 and by which it is determined that the regeneration operation of the oxidation catalyst of the purifier 7 in the fuel cell system 100 needs to be carried out is set to 40 hours. In the above explanation, a predetermined threshold is set for the continuous operating time, and whether the regeneration operation is necessary or not is determined based on the threshold. However, in the case of a DSS (Daily-Start-and-Stop) operation type fuel cell system which starts once a day and stops once a day, a cumulative operating time obtained by accumulating the operating times of respective days is measured, and a predetermined threshold is set for this cumulative operating time. With this, the regeneration operation is carried out at least when the cumulative operating time of the hydrogen generator 4 reaches the predetermined threshold (40 hours in the present embodiment). Since the above-described continuous operating time is one mode of the cumulative operating time, the continuous operating time is included in the cumulative operating time of the present invention.

The control device 10 uses the timer 10a to determine whether or not the continuous operating time has reached the predetermined threshold or more. In a case where the control device 10 determines by the timer 10a that the continuous operating time has reached the predetermined threshold or more, the control device 10 controls to stop the electric power generating operation of the fuel cell 9, and then controls to carry out the regeneration process for regenerating the oxidation catalyst of the purifier 7 in a period Ta (that is, elapsed time 40 h to 41 h) shown in FIG. 3(a).

The regeneration process for regenerating the oxidation catalyst of the purifier 7 will be explained in reference to FIG. 4.

As shown in FIG. 4, in a case where the control device 10 determines that the continuous operating time of the fuel cell system 100 has reached the predetermined threshold or more (YES in Step S1), the control device 10 controls the passage switching valve 8 to stop the electric power generating operation of the fuel cell 9 (Step S2). In a case where the control device 10 determines that the continuous operating time of the fuel cell system 100 has not yet reached the predetermined threshold or more (NO in Step S1), the control device 10 repeatedly executes the determination regarding whether or not the continuous operating time of the fuel cell system 100 has reached the predetermined threshold or more.

Next, the control device 10 controls the flow rate control valve 1a and the flow rate control valve 2a to stop supplying the natural gas from the material supplying device 1 to the reformer 5 of the hydrogen generator 4 and the water from the water supplying device 2 to the reformer 5 of the hydrogen generator 4. Simultaneously, the control device 10 controls the operation of the blower 3a to stop supplying the air from the air supplying device 3 to the purifier 7 of the hydrogen generator 4 (Step S3).

Next, in a case where the control device 10 controls the temperature control unit (the cooler 7b or the heater 7c) and determines that the temperature inside the purifier 7 or a temperature Tp of the oxidation catalyst has become a temperature in a range from 100° C. to 300° C. (YES in Step S4), the control device 10 controls to maintain the temperature Tp of the oxidation catalyst (Step S5). In a case where the control device 10 determines that the internal temperature of the purifier 7 or the temperature Tp of the oxidation catalyst has not yet reached a temperature in a range from 100° C. to 300° C. (NO in Step S4), the control device 10 controls the temperature control unit such that the temperature Tp of the oxidation catalyst is adjusted to be a temperature in the above-described temperature range, and repeatedly executes the determination regarding whether or not the internal temperature of the purifier 7 or the temperature Tp of the oxidation catalyst has reached a predetermined temperature or a temperature in a predetermined temperature range.

After Step S3 in FIG. 4, since the hydrogen-containing gas existing upstream of the purifier 7 is supplied to the purifier 7 by cubical expansion of water by vaporization supplied to the reformer 5 immediately before Step S3, and the supply of the air to the purifier 7 is being stopped, the purifier 7 is filled with the hydrogen-containing gas whose oxygen concentration is lower than usual, and the inside of the purifier 7 is maintained under such an atmosphere that the oxygen concentration is reduced more than usual and reducibility is high. Therefore, a predetermined chemical reaction contributing to the regeneration of the oxidation catalyst proceeds.

Figure 3B:
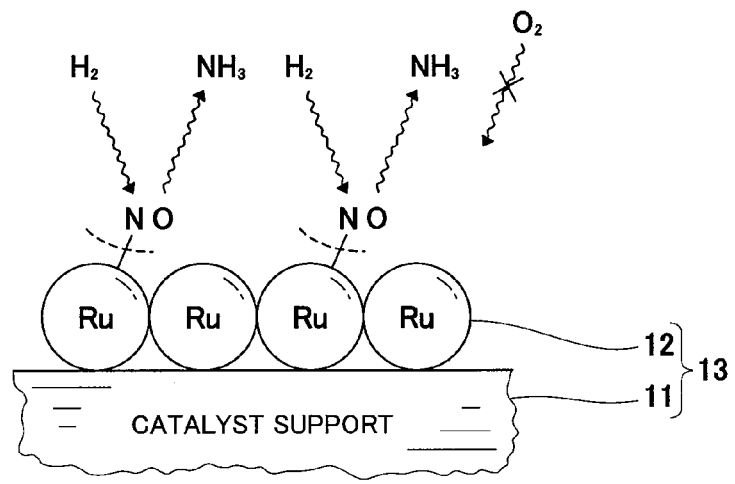

FIG. 3(b) is a schematic diagram schematically showing an estimated mechanism regarding how nitrosyl is removed as ammonia from the oxidation catalyst of the purifier.

As shown in FIG. 3(b), when the air supply, that is, the oxygen supply stops, and the inside of the purifier 7 is controlled to be maintained in a reducing atmosphere, a chemical reaction, shown by Reaction Formula (2), between nitrosyl in which nitrogen atoms are coupled to the Ru catalyst 12 disposed on the catalyst support 11 and hydrogen contained in the hydrogen-containing gas remaining inside the purifier 7 proceeds. Thus, nitrosyl is reduced to ammonia.

$$5H_2 + 2NO \rightarrow 2NH_3 + 2H_2O \tag{2}$$

After that, ammonia generated by the progress of the chemical reaction shown by Reaction Formula (2) is easily removed from the Ru catalyst 12 on the catalyst support 11 constituting the oxidation catalyst body 13. With this, the poisoning of the Ru catalyst 12 is resolved, and the Ru catalyst 12 regains its catalytic activity. Then, the oxidation catalyst of the purifier 7 is regenerated to be able to adequately reduce the concentration of carbon monoxide in the hydrogen-containing gas supplied from the shift converter 6.

After Step S3 shown in FIG. 4, in a case where the inside of the purifier 7 is maintained at a higher reducing atmosphere than usual in the above temperature range as described above, and the control device 10 determines that a predetermined standby time necessary for completing the regeneration process of the oxidation catalyst has passed (YES in Step S6) and that the internal temperature of the reformer 5 or the temperature Tr of the reforming catalyst has decreased up to about 300° C. or less (YES in Step S7), the control device 10 supplies a predetermined amount of the natural gas from the material supplying device 1 toward the reformer 5 of the hydrogen generator 4. With this, the inside of the hydrogen generator 4 is filled with the natural gas, and the hydrogen-containing gas containing the removed ammonia inside the purifier 7 is supplied to the heater 5a of the reformer 5. Then, the control device 10 carries out post-processing, that is, the control device 10 causes the heater 5a of the reformer 5 to burn the hydrogen-containing gas containing ammonia (Step S8). In a case where the control device 10 determines that the predetermined standby time necessary for completing the regeneration process of the oxidation catalyst has not yet passed (NO in Step S6), the control device 10 repeatedly executes the determination regarding whether or not the predetermined standby time has passed. Moreover, in a case where the control device 10 determines that the internal temperature of the reformer 5 or the temperature Tr of the reforming catalyst has not yet decreased up to about 300° C. or less (NO in Step S7), the control device 10 repeatedly executes the determination regarding whether or not the temperature Tr of the reforming catalyst has decreased up to about 300° C. or less.

In the case of regenerating the oxidation catalyst, it is desirable that the regeneration process be carried out when the temperature of the oxidation catalyst, the temperature inside the purifier 7 or the like is in a range from 100° C. to 300° C. That is, in the present embodiment, the temperature of the purifier 7 includes any one of the temperature of the oxidation catalyst and the ambient temperature inside the purifier 7, and it is desirable that the regeneration process be carried out when the temperature of the purifier 7 is in a range from 100° C. to 300° C. This is because if the temperature of the oxidation catalyst or the like is lower than 100° C., the rate of progress of a reduction reaction is significantly slow, and if the temperature of the oxidation catalyst or the like exceeds 300° C., the methanation between carbon monoxide or carbon dioxide contained in the hydrogen-containing gas and hydrogen proceeds out of control, and it becomes difficult to control the temperature of the oxidation catalyst or the like. In Step S4 of FIG. 4, the control device 10 determines using the temperature detector 7a of the purifier 7 whether or not the internal temperature of the purifier 7 or the temperature Tp of the oxidation catalyst has reached a temperature in a range from 100° C. to 300° C.

Moreover, as shown in Step S7 of FIG. 4, it is desirable that a purge operation using the natural gas inside the hydrogen generator 4 be carried out after the internal temperature of the reformer 5 or the temperature Tr of the reforming catalyst has decreased to about 300° C. or less. This is because if the purge operation is carried out when the temperature Tr of the reforming catalyst is higher than 300° C., carbon derived from the natural gas is deposited on the reforming catalyst, and this significantly deteriorates the catalytic activity of the reforming catalyst.

As above, the regeneration process for regenerating the oxidation catalyst of the purifier 7 is appropriately carried out by executing Steps S1 to S8 shown in FIG. 4 in the period Ta shown in FIG. 3(a). By the regeneration process, the oxidation catalyst of the purifier 7 whose catalytic activity has deteriorated by ammonia supplied from the reformer 5 of the hydrogen generator 4 is surely regenerated so as to be able to reduce the concentration of carbon monoxide in the hydrogen-containing gas up to 10 ppm or less again.

After the regeneration process for regenerating the oxidation catalyst of the purifier 7 is carried out in the period Ta shown in FIG. 3(a), the control device 10 controls to carry out a predetermined preparing operation for starting the electric power generating operation of the fuel cell 9. After that, as shown in a period from the elapsed time 41 h to 81 h of FIG. 3(a), the control device 10 controls to carry out the electric power generating operation of the fuel cell system 100 again. In a case where the electric power generating operation of the fuel cell system 100 starts again, the fuel cell 9 starts outputting electric power again.

In a case where the electric power generating operation of the fuel cell system 100 has started again, since the natural gas supplied from the material supplying device 1 to the reformer 5 of the hydrogen generator 4 contains nitrogen, the ammonia concentration and carbon monoxide concentration of the hydrogen-containing gas discharged from the hydrogen generator 4 gradually increase as the time of the electric power generating operation of the fuel cell system 100 elapses, as with the previous electric power generating operation of the fuel cell system 100 shown in the range from elapsed time 0 h to 40 h of FIG. 3(a). However, in a case where the concentration of nitrogen in the natural gas supplied from the material supplying device 1 to the reformer 5 of the hydrogen generator 4 does not change, the changes of the ammonia concentration and carbon monoxide concentration of the hydrogen-containing gas and the changes of the output voltage of the fuel cell 9 become the same as those of the previous electric power generating operation of the fuel cell system 100. In the present embodiment, as with the previous electric power generating operation of the fuel cell system 100, the electric power generating operation of the fuel cell 9 is periodically stopped when the continuous operating time of the fuel cell system 100 has reached the predetermined threshold or more (40 hours in the present embodiment). After that, the regeneration process of the oxidation catalyst in the purifier 7 is carried out periodically.

In Step 3 in the regeneration process, the supply of the material gas and water to the reformer 5 has been stopped, and the supply of the air to the purifier 7 has been stopped. However, the regeneration operation may be carried out in a state where only the supply of the air from the air supplying device 3 is stopped, and the material gas and the water are continuously supplied to the reformer 5 to continuously generate the hydrogen-containing gas. This embodiment does not require the purge operation using the material gas inside the hydrogen generator 4 shown by Step S8 of FIG. 4. To be specific, it is unnecessary to warm up the reformer 5 and the shift converter 6 which have cooled down during the regeneration process shown in FIG. 4. Therefore, this embodiment is further preferable since it realizes smooth shifting to the electric power generating operation of the fuel cell 9.

In the regeneration process, the supply of the air to the purifier 7 is stopped in Step S3. However, even if the amount of the oxidation gas (air) supplied to the purifier 7 is controlled to be at least less than that of the normal electric power generating operation to realize a more reducing atmosphere than the atmosphere of the normal operation, it is possible to proceed the regeneration of the oxidation catalyst. This can be similarly carried out in the case of the regeneration process in which the material gas and the water are continuously supplied to the reformer 5 in Step S3.

The regeneration process shown in FIG. 4 is the regeneration process of the oxidation catalyst in the fuel cell system which operates continuously. However, for example, in the case of the DDS operation type fuel cell system, the regeneration process may be carried out each time the fuel cell system stops or starts. Moreover, the regeneration process may be carried out when the fuel cell system stops or starts after the cumulative operating time of the fuel cell system has reached the predetermined threshold or more by which it is determined that the regeneration process needs to be carried out. Moreover, in a case where the regeneration process is carried out at the time of the start-up operation, a timing for starting supplying the oxidation gas (air) to the purifier 7 is set to be later than a timing for starting supplying the oxidation gas (air) in the normal start-up operation by a predetermined period (Ta for example), and the more reducing atmosphere than that of the normal start-up operation is realized in this predetermined period. Even in such configuration, it is possible to surely regenerate the oxidation catalyst poisoned by ammonia.

In the regeneration process described above, the oxidation catalyst is regenerated by reducing the amount of the air supplied from the air supplying device 3 to further improve the reducibility of the atmosphere inside the purifier 7 more than usual. However, the amount of the air supplied from the air supplying device 3 may be controlled not to be reduced, and the temperature of the oxidation catalyst (purifier 7) may be controlled to be higher than the control temperature before carrying out the regeneration process. Especially, by controlling the temperature control unit (heater 7c for example) of the purifier 7b such that the temperature Tp of the oxidation catalyst becomes higher (180° C. for example) than the control temperature (140° C. for example) of the oxidation catalyst in the normal operation, the reduction reaction of the oxidation catalyst is accelerated in accordance with reaction kinetics. Since this regenerates the oxidation catalyst, such regeneration process may be carried out.

As above, in the case of adopting as the regeneration operation a method for maintaining the temperature of the oxidation catalyst to be higher than that of the normal electric power generating operation, it is contemplated that means for increasing the amount of the oxidation gas (air) supplied to the purifier 7 to increase the reaction heat in the oxidation catalyst is adopted as one of means for heating the oxidation catalyst. However, by carrying out an experiment in which the hydrogen-containing gas containing ammonia at a concentration of 10 ppm is supplied to carry out the oxidation under a condition of oxygen/carbon monoxide=2, and the amount of the air is increased to be oxygen/carbon monoxide=2.5 when the carbon monoxide concentration at a position downstream of the oxidation catalyst is 30 ppm, it is found that increasing the amount of the oxidation gas (air) accelerates the oxidation of Ru, and the deterioration of Ru accelerates adversely. Therefore, in the case of carrying out the regeneration of the oxidation catalyst while maintaining the temperature of the oxidation catalyst to be higher than that of the normal electric power generating operation, it is preferable that the temperature of the oxidation catalyst be increased using the cooler 7b or the heater 7c shown in FIG. 1 without increasing the amount of the oxidation gas supplied. In such configuration, it is possible to appropriately regenerate the oxidation catalyst poisoned by ammonia without deteriorating the oxidation catalyst.

The regeneration operation of the oxidation catalyst of the purifier 7 may be carried out at the time of any one of the stop operation and the start-up operation of the fuel cell system 100.

In the present description, as in the above embodiment, the threshold of the continuous operating time by which it is determined that the regeneration operation of the oxidation catalyst included in the purifier 7 needs to be carried out is determined based on the cumulative amount of ammonia (upper limit of the cumulative amount of ammonia according to the present invention) accumulated until the deterioration of the oxidation catalyst proceeds by the poisoning of ammonia, and the carbon monoxide concentration of the hydrogen-containing gas at a position downstream of the purifier 7 reaches a predetermined carbon monoxide concentration (30 ppm for example) by which it is determined that the regeneration operation needs to be carried out. For example, the cumulative amount of ammonia supplied to the oxidation catalyst of the purifier 7 after the start of operation of the hydrogen generator 4 is defined as the continuous operating time at which the cumulative amount of ammonia is assumed to reach the upper limit. Moreover, for more security, the cumulative amount of ammonia may be defines as the continuous operating time which is assumed to reach a predetermined value that is lower than the upper limit. The predetermined carbon monoxide concentration by which it is determined that the regeneration operation of the oxidation catalyst needs to be carried out is defined as, for example, such a carbon monoxide concentration that the catalyst of the fuel cell deteriorates by supplying carbon monoxide to the fuel cell 9 and the electric power generation of the fuel cell 9 cannot be continued.

In the present description, the threshold of the continuous operating time by which it is determined that the regeneration operation of the oxidation catalyst included in the purifier 7 needs to be carried out is determined based on the cumulative amount of ammonia (upper limit of the cumulative amount of ammonia according to the present invention) accumulated until the deterioration of the oxidation catalyst proceeds by the poisoning of ammonia, and the concentration of unreacted oxygen in the hydrogen-containing gas at a position downstream of the purifier 7 reaches the predetermined oxygen concentration by which it is determined that the regeneration operation needs to be carried out. This utilizes such a property that the concentration of unreacted oxygen in the unreacted hydrogen-containing gas increases if the ammonia poisoning in the purifier 7 proceeds, the oxidation on the oxidation catalyst does not adequately proceed, and the carbon monoxide concentration of the hydrogen-containing gas at a position downstream of the purifier 7 increases. The predetermined oxygen concentration by which it is determined that the regeneration operation of the oxidation catalyst needs to be carried out is defined as, for example, the oxygen concentration of the hydrogen-containing gas when the carbon monoxide concentration has reached the predetermined carbon monoxide concentration (30 ppm for example) by which it is determined that the regeneration operation needs to be carried out.

Embodiment 2

A hardware configuration of a fuel cell system according to Embodiment 2 of the present invention is the same as that of the fuel cell system 100 described in Embodiment 1. Therefore, detailed explanations of the configuration of the fuel cell system are omitted in the present embodiment.

The poisoning of the purified catalyst (oxidation catalyst) in the purifier 7 of the hydrogen generator 4 proceeds in proportion to a cumulative amount of the hydrogen-containing gas containing ammonia supplied from the reformer 5 through the shift converter 6 to the purifier 7. To be specific, the poisoning of the purified catalyst (oxidation catalyst) in the purifier 7 proceeds in proportion to a cumulative amount (cumulative amount of the material gas, that is, the gas containing the nitrogen-containing compound) of the natural gas that is the raw material supplied from the material supplying device 1 toward the reformer 5 of the hydrogen generator 4. In the present embodiment, in a case where instead of the continuous operating time in Embodiment 1, the cumulative amount of the natural gas supplied from the material supplying device 1 to the reformer 5 of the hydrogen generator 4 has reached a predetermined threshold or more, the electric power generating operation of the fuel cell 9 is stopped, and the regeneration process of the purified catalyst (oxidation catalyst) in the purifier 7 is carried out.

In the present embodiment, whether or not the cumulative amount of the natural gas supplied from the material supplying device 1 to the reformer 5 of the hydrogen generator 4 has reached the predetermined threshold or more is determined by the control device 10 based on the output signal of the flow rate detecting portion 1b in the material supplying device 1.

Figure 5:
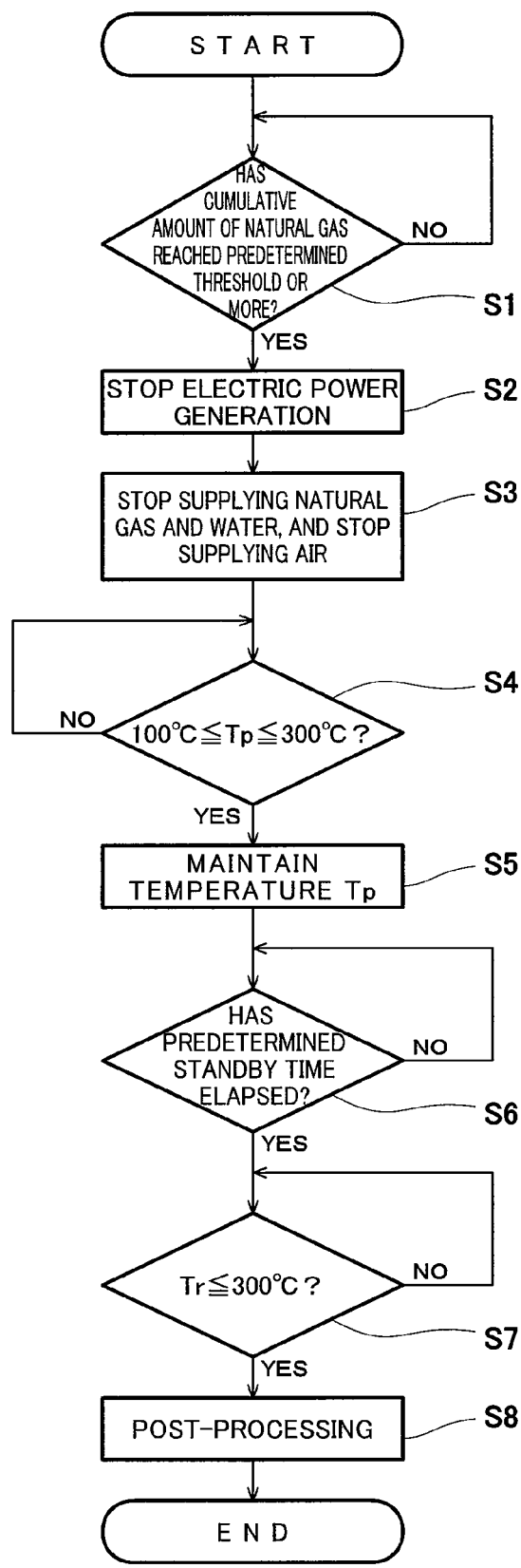
FIG. 5 is a flow chart schematically showing the regeneration process of the oxidation catalyst according to Embodiment 2 of the present invention.

FIG. 5 is a flow chart schematically showing the regeneration process of the oxidation catalyst according to Embodiment 2 of the present invention.

As shown in FIG. 5, in a case where the control device 10 of the fuel cell system 100 determines that the cumulative amount of the natural gas supplied from the material supplying device 1 to the reformer 5 of the hydrogen generator 4 has reached the predetermined threshold or more (YES in Step S1), the control device 10 controls the passage switching valve 8 to stop the electric power generating operation of the fuel cell 9 (Step S2).

Next, the control device 10 controls the flow rate control valve 1a and the flow rate control valve 2a to stop supplying the natural gas from the material supplying device 1 to the reformer 5 of the hydrogen generator 4 and the water from the water supplying device 2 to the reformer 5 of the hydrogen generator 4. Simultaneously, the control device 10 controls the operation of the blower 3a to stop supplying the air from the air supplying device 3 to the purifier 7 of the hydrogen generator 4 (Step S3).

Next, in a case where the control device 10 controls the temperature control unit (the cooler 7b or the heater 7c) and determines that the temperature inside the purifier 7 or the temperature Tp of the oxidation catalyst has become a temperature in a range from 100° C. to 300° C. (YES in Step S4), the control device 10 controls to maintain the temperature Tp of the oxidation catalyst (Step S5). With this, as with Embodiment 1, the predetermined chemical reaction contributing to the regeneration of the oxidation catalyst included in the purifier 7 of the hydrogen generator 4 proceeds.

Then, in a case where the control device 10 determines that the predetermined standby time necessary for completing the regeneration process of the oxidation catalyst has elapsed (YES in Step S6) and that the temperature inside the reformer 5 or the temperature Tr of the reforming catalyst has decreased to about 300° C. or less (YES in Step S7), the control device 10 supplies a predetermined amount of the natural gas from the material supplying device 1 to the reformer 5 of the hydrogen generator 4. With this, as with Embodiment 1, the inside of the hydrogen generator 4 is filled with the natural gas, and the hydrogen-containing gas containing the removed ammonia inside the purifier 7 is supplied to the heater 5a. Then, the control device 10 carries out the post-processing, that is, the control device 10 causes the heater 5a to burn the hydrogen-containing gas containing ammonia (Step S8).

Note that the other points, such as a regeneration operation carried out in place of the above regeneration operation and the definition of the predetermined threshold set for the cumulative amount of the raw material supplied, are the same as those in Embodiment 1.

As above, the regeneration process for regenerating the oxidation catalyst of the purifier 7 is carried out by executing Steps S1 to S8 shown in FIG. 5 in the period Ta shown in FIG. 3(a). By the regeneration process, the oxidation catalyst of the purifier 7 whose catalytic activity has deteriorated by ammonia supplied from the reformer 5 is regenerated so as to be able to reduce the concentration of carbon monoxide in the hydrogen-containing gas up to 10 ppm or less again.

Even in such configuration, it is possible to provide a fuel cell system capable of stably supplying electric power for a long period of time even if the natural gas contains nitrogen, ammonia generated in the reforming reaction is supplied to the oxidation catalyst, and the oxidation catalyst is poisoned.

Embodiment 3

The hardware configuration of a fuel cell system according to Embodiment 3 of the present invention is the same as that of the fuel cell system 100 in Embodiment 1. Therefore, detailed explanations of the configuration of the fuel cell system are omitted in the present embodiment.

The poisoning of the purified catalyst (oxidation catalyst) in the purifier 7 of the hydrogen generator 4 proceeds in proportion to the cumulative amount of the electric power generated by the fuel cell 9. In the present embodiment, in a case where instead of the continuous operating time and the cumulative amount of the material gas in Embodiments 1 and 2, the cumulative amount of the electric power generated by the fuel cell 9 has reached a predetermined threshold or more, the electric power generating operation of the fuel cell 9 is stopped, and the regeneration process of the purified catalyst (oxidation catalyst) in the purifier 7 is carried out.

In the present embodiment, whether or not the cumulative amount of the electric power generated by the fuel cell 9 has reached a predetermined threshold or more is determined by the control device 10 based on, for example, the output signal of, for example, an inverter not shown in FIG. 1.

In the present embodiment, in a case where the control device 10 of the fuel cell system 100 determines that the cumulative amount of the electric power generated by the fuel cell 9 has reached a predetermined threshold or more, the control device 10 controls the passage switching valve 8 to stop the electric power generating operation of the fuel cell 9. Then, the control device 10 controls the flow rate control valve 1a and the flow rate control valve 2a to stop supplying the natural gas from the material supplying device 1 to the reformer 5 of the hydrogen generator 4 and the water from the water supplying device 2 to the reformer 5 of the hydrogen generator 4. Moreover, the control device 10 stops supplying the air from the air supplying device 3 to the purifier 7 of the hydrogen generator 4.

Next, in a case where the control device 10 determines that the temperature inside the purifier 7 or the temperature Tp of the oxidation catalyst has become a temperature in a range from 100° C. to 300° C., the control device 10 carries out the regeneration process of the oxidation catalyst while controlling to maintain this temperature state. In a case where the control device 10 determines that a predetermined standby time has elapsed and that the temperature inside the reformer 5 or the temperature Tr of the reforming catalyst has decreased up to about 300° C. or less, the control device 10 supplies a predetermined amount of the natural gas from the material supplying device 1 to the reformer 5 of the hydrogen generator 4. With this, as with Embodiments 1 and 2, the inside of the hydrogen generator 4 is filled with the natural gas, and the hydrogen-containing gas in the purifier 7 is pushed out and is supplied to the heater 5a of the reformer 5.

As above, in the present embodiment, the control device 10 controls to carry out the regeneration process of the oxidation catalyst when the cumulative amount of the electric power generated by the fuel cell 9 has reached a predetermined threshold or more, and the control device 10 supplies a predetermined amount of the natural gas from the material supplying device 1 to the reformer 5 of the hydrogen generator 4 when the control device 10 determines that a predetermined standby time necessary for completing the regeneration process of the oxidation catalyst has elapsed. Then, the control device 10 supplies to the heater 5a the hydrogen-containing gas containing the removed ammonia inside the purifier 7 and burns it.

Note that the other points, such as a regeneration operation carried out in place of the above regeneration operation and the definition of the predetermined threshold set for the cumulative amount of the raw material supplied, are the same as those in Embodiments 1 and 2.

Even in such configuration, it is possible to provide a fuel cell system capable of stably supplying electric power for a long period of time even if the natural gas contains nitrogen.

Embodiments 1 to 3 explained a case where the reforming reaction for obtaining hydrogen was the steam-reforming reaction, and the natural gas containing nitrogen was used as the gas containing the nitrogen-containing compound. However, even if the material gas does not contain nitrogen in a case where the reforming reaction is autothermal reforming or partial oxidation reforming, the air supplied to the reformer 5 contains nitrogen at high concentration, so that ammonia is generated during the reforming reaction by nitrogen in the air. In this case, the control device 10 may be configured to start the regeneration operation of the oxidation catalyst in a case where the air is regarded as the gas containing nitrogen, and the cumulative amount of the air supplied to the reformer 5 has become a predetermined threshold or more determined based on the upper limit of the cumulative amount of ammonia described in Embodiment 1. Moreover, the control device 10 may be configured to start the regeneration operation of the oxidation catalyst in a case where the number of times of the start and stop of the fuel cell system 100 is regarded as a parameter related to the cumulative amount of ammonia, and the number of times of the start and stop of the fuel cell system 100 has become a predetermined threshold or more determined based on the upper limit of the cumulative amount of ammonia described in Embodiment 1.

Moreover, the amount of the electric power generated by the fuel cell 9 is in proportion to load electric power. Here, the control device 10 may be configured to start the regeneration operation of the oxidation catalyst in a case where the cumulative amount of the load electric power is used instead of the cumulative amount of the electric power generated, and the cumulative amount of the load electric power has become a predetermined threshold or more determined based on the upper limit of the cumulative amount of ammonia described in Embodiment 1. Note that the cumulative amount of the load electric power is calculated by the control device 10 based on, for example, an output signal of a load electric power detector not shown in FIG. 1.

Moreover, in the steam-reforming reaction or an autothermal reaction, the amount of the water supplied to the reformer 5 and the amount of the oxidation gas supplied to the purifier 7 are usually in proportion to the amount of the material gas containing nitrogen supplied to the reformer 5. Here, the control device 10 may be configured to start the regeneration operation of the oxidation catalyst in a case where instead of the cumulative amount of the raw material described in Embodiment 2, the cumulative amount of the water supplied to the reformer 5 or the cumulative amount of the oxidation gas supplied to the purifier 7 has become a predetermined threshold determined based on the upper limit of the cumulative amount of ammonia described in Embodiment 1. In this case, the cumulative amount of the water or the cumulative amount of the oxidation gas is calculated by the control device 10 based on cumulative data of output command values from the control device 10 to the water supplying device 2 or the air supplying device 3.

The cumulative operating time of the fuel cell system 100, the cumulative amount of the raw material supplied to the reformer 5, the cumulative amount of the electric power generated by the fuel cell 9, etc. are exemplified as parameters related to the cumulative amount of ammonia according to the present invention. However, the present embodiment is not limited to the above parameters, and any parameter may be used as long as the parameter is a parameter related to the cumulative amount of ammonia.

Embodiment 4

Embodiments 1 to 3 exemplified a case where the natural gas containing nitrogen at a concentration of about 3% is supplied from the material supplying device to the reformer of the hydrogen generator.

As described at the beginning of Embodiment 1, the concentration of nitrogen contained in the natural gas differs depending on areas where the natural gas is supplied and supply companies which supply the natural gas. To be specific, the amount of ammonia supplied per unit time from the reformer to the purifier in the electric power generating operation of the fuel cell system differs depending on areas where the fuel cell system is set up and supply companies which supply the natural gas to the fuel cell system. Therefore, the degree of progress of the deterioration of the oxidation catalyst included in the purifier of the fuel cell system differs depending on, for example, areas where the fuel cell system is set up. On this account, in order to stably obtain electric power for a long period of time using the fuel cell system, the regeneration operation of the oxidation catalyst included in the purifier needs to be carried out at an appropriate timing in accordance with information, such as areas where the fuel cell system is set up.

The present embodiment will explain an embodiment in which the regeneration operation of the oxidation catalyst included in the purifier is carried out at an appropriate timing in accordance with information, such as areas where the fuel cell system is set up.

First, a characteristic configuration of the fuel cell system according to the present embodiment will be explained.

Figure 6:
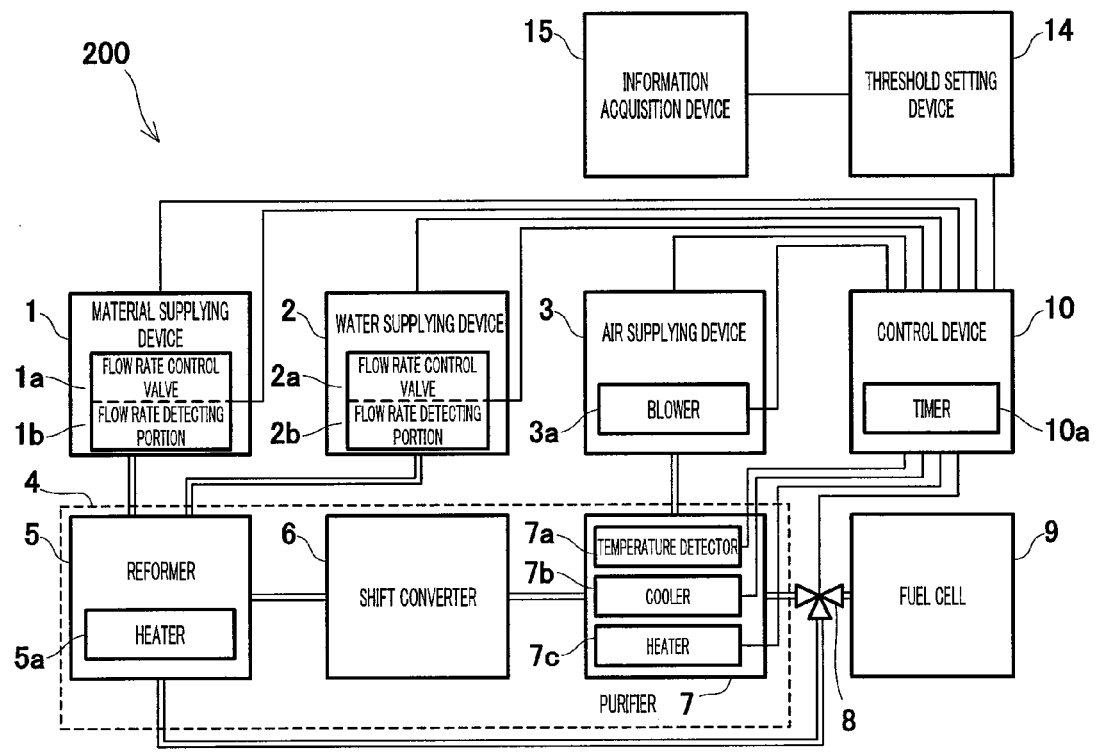
FIG. 6 is a block diagram schematically showing the configuration of the fuel cell system according to Embodiment 4 of the present invention.

FIG. 6 is a block diagram schematically showing the configuration of the fuel cell system according to Embodiment 4 of the present invention. In FIG. 6, only components necessary for explaining the present invention are shown, and the other components are omitted.

As shown in FIG. 6, the hardware configuration of a fuel cell system 200 according to the present embodiment is basically the same as that of the fuel cell system 100 described in Embodiment 1. However, as shown in FIG. 6, the fuel cell system 200 according to the present embodiment further includes a threshold setting device 14 in addition to the components of the fuel cell system 100 described in Embodiment 1. Moreover, the fuel cell system 200 according to the present embodiment further includes an information acquisition device 15 which acquires information related to the concentration of the nitrogen compound in the gas containing the nitrogen-containing compound. The information acquisition device 15 is a device capable of acquiring information related to the concentration of the nitrogen-containing compound by, for example, an operator operating a dial, a switch, a remote controller or the like. Based on the information acquired by the information acquisition device 15, the threshold setting device 14 suitably sets according to need a threshold for, for example, a continuous operating time which is used to determine the timing for carrying out the regeneration operation of the oxidation catalyst included in the purifier 7. The threshold setting device 14 and the control device 10 are connected to each other by predetermined wiring materials. Moreover, the information acquisition device 15 and the threshold setting device 14 are connected to each other by predetermined wiring materials. Moreover, the other components of the fuel cell system 200 are the same as those of the fuel cell system 100 described in Embodiment 1.

Next, a technical concept that is a basis of a characteristic operation of the fuel cell system according to the present embodiment will be explained.

FIG. 7 is a correspondence diagram showing, for respective areas where the natural gas is supplied, relations between the concentration (%) of nitrogen contained in the natural gas and the concentration (ppm) of ammonia in the hydrogen-containing gas generated using the natural gas containing nitrogen.

As explained in Embodiment 1, in a case where the natural gas used as the material gas contains nitrogen, ammonia is regenerated in the reformer of the hydrogen generator by the chemical reaction between nitrogen contained in the natural gas and hydrogen generated through the steam-reforming reaction. The concentration of generated ammonia is low when the concentration of nitrogen contained in the natural gas is low and is high when the concentration of nitrogen contained in the natural gas is high.

For example, as shown in FIG. 7, in a case where the concentration of nitrogen contained in the natural gas is about 0.1% (Area A), the concentration of ammonia generated in the reformer of the hydrogen generator is about 1 ppm. In a case where the concentration of nitrogen contained in the natural gas is about 3% (Area D), the concentration of ammonia generated in the reformer of the hydrogen generator is about 5 ppm. Note that in a case where the natural gas does not contain nitrogen at all, ammonia is not generated in the reformer of the hydrogen generator.

As shown in FIG. 7, the concentration of nitrogen contained in the natural gas may differ depending on areas where the natural gas is supplied (areas where the material gas is supplied). For example, the natural gas supplied in Area B contains nitrogen at a concentration of about 1%. In this case, the concentration of ammonia generated in the reformer of the hydrogen generator is about 0.3 ppm. The natural gas supplied in Area C contains nitrogen at a concentration of about 2%. In this case, the concentration of ammonia generated in the reformer of the hydrogen generator is about 2 ppm. Moreover, the concentration of nitrogen contained in the natural gas may differ even in the same area depending on supply companies which supply the natural gas (suppliers which supply the material gas).

Here, in the case of using the natural gas containing nitrogen at a concentration of about 0.1%, the amount of ammonia generated in the reformer is about half the amount of ammonia generated in the reformer in the case of using the natural gas containing nitrogen at a concentration of about 2%. Therefore, a time until the concentration of carbon monoxide in the hydrogen-containing gas discharged from the hydrogen generator exceeds the upper limit (10 ppm for example) is about twice.

In the present embodiment, by an operator operating a dial, a switch, a remote controller or the like, the information acquisition device 15 obtains the nitrogen concentration related information, such as the area where the natural gas is supplied and the type of the supply company which supplies the natural gas, as one example of the information related to the concentration of the nitrogen-containing compound of the present invention. Based on this information, the threshold setting device 14 sets, for example, the threshold of the continuous operating time. Specifically, in the present embodiment, in a case where the fuel cell system 200 is set up in Area D where the natural gas whose nitrogen concentration is about 3% is used, a signal related to Area D is input to the fuel cell system 200 via the information acquisition device 15 by the operation of the operator, and the threshold setting device 14 sets the threshold of the continuous operating time to, for example, 40 hours based on this signal. In a case where the fuel cell system 200 is set up in Area A where the natural gas whose nitrogen concentration is about 0.1% is used, the amount of ammonia generated decreases to about ⅕ by the decrease of the nitrogen concentration from about 3% to 0.1%, so that the threshold setting device 14 sets the threshold of the continuous operating time to, for example, 200 hours.

In the present embodiment, optimal thresholds regarding the continuous operating time, etc. are prestored in the memory of the control device 10 of the fuel cell system 200 for respective areas where the natural gas is supplied. Moreover, optimal thresholds regarding the continuous operating time, etc. are prestored in the memory of the control device 10 for respective supply companies which supply the natural gas. Therefore, the nitrogen concentration related information is obtained by the information acquisition device 15 by, for example, the operation of the operator, and then, an optimal threshold of, for example, the continuous operating time is set by the threshold setting device 14 based on correspondence between the nitrogen concentration related information prestored in the memory of the control device 10 and the threshold of, for example, the continuous operating time corresponding to the nitrogen concentration related information and also based on the nitrogen concentration related information, such as the area where the fuel cell system 200 is set up and the supply company of the natural gas. With this, when shipping or setting up the fuel cell system 200, the threshold regarding the parameter, such as the continuous operating time, related to the cumulative amount of ammonia can be easily set to an optimal value corresponding to the set-up area by the operation of the operator. Further, in the case of setting up the fuel cell system 200 in the other area where the concentration of nitrogen in the natural gas is different, it is possible to easily change the setting of the threshold regarding, for example, the continuous operating time.

As above, in accordance with the present embodiment, in a case where a predetermined parameter, typically the continuous operating time, related to the cumulative amount of ammonia becomes equal to or more than a predetermined threshold preset based on the nitrogen concentration related information related to the concentration of nitrogen in the natural gas, the electric power generating operation of the fuel cell 9 is stopped, and then, the regeneration process of the oxidation catalyst is carried out in the purifier 7 of the hydrogen generator 4. Thus, it is possible to preferably suppress the significant progress of the poisoning of the oxidation catalyst for a long period of time. With this, in the fuel cell system 200 which uses the natural gas containing nitrogen as the material gas, the poisoning of the oxidation catalyst by ammonia is preferably suppressed for a long period of time, and it is possible to effectively prevent the output voltage of the fuel cell 9 from decreasing to a standard value or less due to the increase in concentration of carbon monoxide in the hydrogen-containing gas because of the progress of the poisoning of the oxidation catalyst in the purifier 7.

Hereinafter, a more specific operational concept of the fuel cell system 200 according to the present embodiment will be exemplified.

FIG. 8 is a correspondence diagram schematically showing relations among the nitrogen concentration related information related to the concentration of nitrogen in the natural gas, the concentration of nitrogen in the natural gas, a predetermined threshold, and a number to be input using the information acquisition device, which are prestored in the memory of the control device.

As shown in FIG. 8, the concentration of nitrogen contained in the natural gas differs depending on areas where the natural gas is supplied and suppliers which supply the natural gas. For example, the natural gases supplied by suppliers A to D in an area whose area code is 03 in Tokyo of the Kanto area contain nitrogen at a concentration of a % to d % whereas the natural gases supplied by suppliers A and B in an area whose area code is 042 in Tokyo of the Kanto area contain nitrogen at a concentration of e % and f %. Moreover, the natural gases supplied by suppliers E and F in an area whose area code is 06 in Osaka of the Kansai area contain nitrogen at a concentration of g % to h % whereas the natural gas supplied by a supplier E in an area whose area code is 072 in Osaka of the Kansai area contains nitrogen at a concentration of i %. In a case where the operator controls a dial of the information acquisition device 15 shown in FIG. 6 to select a dial number corresponding to a place where the fuel cell system 200 is set up (shipped), the threshold setting device 14 sets an appropriate threshold from a group (here, a group of thresholds regarding the continuous operating time) of a plurality of thresholds prestored in the memory of the control device 10. For example, in a case where the fuel cell system 200 is set up in the area whose area code is 03 in Tokyo of the Kanto area, and the supplier of the natural gas is D, the operator operates the dial of the information acquisition device 15 to select Dial Number 4. With this, a predetermined continuous operating time S4 is set as a predetermined threshold by the threshold setting device 14.

As the nitrogen concentration related information related to the concentration of nitrogen in the natural gas, the present embodiment explained the dial number selected by the dial. However, the present embodiment may be configured such that information, such as the area, the city and the area code, is used as the information of the supply area, such information is obtained using an input device, such as a remote controller, and the threshold setting device 14 sets an optimal threshold as the nitrogen concentration related information by referring to a table of FIG. 8 stored in the memory. Moreover, the nitrogen concentration related information is not limited to this. For example, the present embodiment may be configured based on the voltage and/or frequency of a commercial power supply for driving the fuel cell system 200. In this case, the frequency of the commercial power supply can be easily detected by, for example, disposing in the control device 10 an information acquisition device capable of automatically detecting the frequency of the commercial power supply. In this case, by configuring the present embodiment such that the threshold setting device 14 automatically sets a predetermined threshold based on the frequency of the commercial power supply obtained by the information acquisition device, the regeneration operation of the oxidation catalyst included in the purifier 7 can be carried out more easily.

Moreover, the present embodiment explained the information of the supplier as the nitrogen concentration related information. However, the present embodiment is not limited to this. For example, the present embodiment may be configured based on the type and composition of the natural gas.

Moreover, the present embodiment explained as the information acquisition device 15 the dial, the switch, the remote controller, etc. which can be operated by the operator. However, the information acquisition device 15 may be a device which acquires information related to the concentration of the nitrogen-containing compound through the Internet connection, GPS or the like. The information acquisition device 15 is not limited to these as long as it is a device capable of acquiring the above information.

In accordance with Embodiments 1 to 4 of the present invention, it is possible to effectively prevents the output voltage of the fuel cell from decreasing to a standard value or less for a long period of time while basically having the same hardware configuration as that of the conventional fuel cell system.

The above embodiments explained the setting of the threshold regarding the parameter related to the cumulative amount of ammonia in a case where the natural gas contains nitrogen. However, in the case of using LPG as the raw material, amine may remain in the LPG due to amine cleaning as desulphurization. In this case, since there is a possibility that ammonia is generated in the reformer of the hydrogen generator, the threshold of, for example, the predetermined continuous operating time may be preset according to need.

Moreover, discussed in recent years is mixing a liquefied gas, such as the LPG, with the nitrogen-containing compound as an odorant. One example of the nitrogen-containing compound is an isonitrile compound. In this case, since the isonitrile compound contains nitrogen elements, ammonia is generated in the reformer of the hydrogen generator. Therefore, in the case of using the liquefied gas, such as the LPG containing the nitrogen-containing compound, the present invention may be suitable applied. With this, it is possible to stably obtain electric power from the fuel cell system for a long period of time.

Moreover, in a case where the amount of the natural gas supplied to the reformer of the hydrogen generator, the type and amount of the reforming catalyst in the reformer, the type and amount of the shift catalyst in the shift converter, the type and amount of the oxidation catalyst in the purifier, the configuration of the fuel cell system and the like differ, the decreased amount of the output voltage of the fuel cell and the time it takes for the decrease of the output voltage of the fuel cell differ. Therefore, in such case, the threshold regarding, for example, the continuous operating time may be set properly.

INDUSTRIAL APPLICABILITY

A hydrogen generator, a fuel cell system and their operating methods according to the present invention have adequate industrial applicability as a hydrogen generator capable of resolving poisoning of an oxidation catalyst which proceeds with time and stably supplying a high-quality hydrogen-containing gas for a long period of time even if a raw material contains nitrogen, a fuel cell system capable of stably supplying desired electric power for a long period of time, and their operating methods.

The invention claimed is:

1. A method for operating a hydrogen generator, the method comprising steps of:
generating a hydrogen-containing gas through a reforming reaction in a reformer which is supplied with a raw material;
supplying a gas containing a nitrogen-containing compound to said reformer by a gas supplying unit;
removing, in a CO remover including an oxidation catalyst, carbon monoxide in the hydrogen-containing gas by oxidation with the use of the oxidation catalyst, the oxidation catalyst containing a metal to be poisoned by ammonia; and
starting a regeneration operation of said CO remover when a parameter regarding an integrated supply amount of ammonia supplied to said CO remover becomes equal to or more than a predetermined threshold with an increase in the integrated supply amount of ammonia, wherein:
the reformer generates the hydrogen-containing gas together with ammonia,
when the regeneration operation is not being executed, the hydrogen-containing gas containing the ammonia generated by the reformer is supplied to the CO remover, and
the integrated supply amount of ammonia is an integrated supply amount of the ammonia generated by the reformer.

2. The method for operating a hydrogen generator according to claim 1, wherein the gas containing a nitrogen-containing compound is any one of the raw material containing the nitrogen-containing compound and air supplied to said reformer in a case where the reforming reaction is autothermal reforming or partial oxidation re forming.

3. The method for operating a hydrogen generator according to claim 2, wherein the nitrogen-containing compound is any one of a nitrogen molecule, amine and isonitrile.

4. The method for operating a hydrogen generator according to claim 1, further comprising steps of:
acquiring information related to a concentration of the nitrogen-containing compound in the gas containing a nitrogen-containing compound; and
setting a predetermined threshold based on the acquired information.

5. The method for operating a hydrogen generator according to claim 4, wherein the information is any one of information regarding the concentration of the nitrogen-containing compound, information regarding a type of the gas containing the nitrogen-containing compound, positional information and information regarding a supplier of the gas containing the nitrogen-containing compound.

6. The method for operating a hydrogen generator according to claim 1, wherein the step of starting the regeneration operation comprises steps of:
detecting a temperature of said CO remover; and
controlling the temperature of said CO remover so that the temperature becomes higher than a control temperature that is a temperature before starting the regeneration operation.

7. The method for operating a hydrogen generator according to claim 6, further comprising replacing a gas in a gas passage included in the hydrogen generator with a purge gas, wherein the step of starting the regeneration operation comprises steps of:
stopping supply of an oxidation gas to said CO remover; and
controlling, at a time of a stop operation of the hydrogen generator, the temperature of said CO remover so that the temperature becomes higher than the control temperature that is the temperature before starting the regeneration operation, before starting supplying the purge gas.

8. The method for operating a hydrogen generator according to claim 1, wherein the step of starting the regeneration operation comprises steps of:
detecting a temperature of said CO remover; and
controlling the temperature of said CO remover so that the temperature becomes higher than a normal control temperature.

9. The method for operating a hydrogen generator according to claim 8, further comprising replacing a gas in a gas passage included in the hydrogen generator with a purge gas, wherein the step of starting the regeneration operation comprises steps of:
stopping supply of an oxidation gas to said CO remover; and
controlling, at a time of a stop operation of the hydrogen generator, the temperature of said CO remover so that the temperature becomes higher than the normal control temperature, before starting supplying the purge gas.

10. The method for operating a hydrogen generator according to claim 1, wherein the step of starting the regeneration operation comprises making a timing for starting supplying the oxidation gas used for the oxidation to said CO remover later than the timing at a time of a normal start-up operation of the hydrogen generator, at a time of a start-up operation of the hydrogen generator.

11. The method for operating a hydrogen generator according to claim 1, wherein the step of starting the regeneration operation comprises making an amount of the oxidation gas supplied to said CO remover for the oxidation smaller than the amount at a time of a normal operation, at a time of a start-up operation of the hydrogen generator.

12. The method for operating a hydrogen generator according to claim 1, wherein the regeneration operation is started if a cumulative operating time of the hydrogen generator has reached a predetermined threshold or more determined based on an upper limit of the integrated supply amount of ammonia.

13. The method for operating a hydrogen generator according to claim 12, wherein the upper limit of the integrated supply amount of ammonia is an integrated supply amount of ammonia supplied to said CO remover until a concentration of carbon monoxide in the hydrogen-containing gas which has passed through said CO remover reaches a predetermined concentration at which the regeneration operation needs to be started.

14. The method for operating a hydrogen generator according to claim 12, wherein the upper limit of the integrated supply amount of ammonia is an integrated supply amount of ammonia supplied to said CO remover until a concentration of oxygen in the hydrogen-containing gas which has passed through said CO remover reaches a predetermined concentration at which the regeneration operation needs to be started.

15. The method for operating a hydrogen generator according to claim 1, further comprising supplying water to said reformer, wherein:

the regeneration operation is started if a cumulative amount of the water supplied to said reformer has reached a predetermined threshold or more determined based on an upper limit of the integrated supply of ammonia.

16. The method for operating a hydrogen generator according to claim 1, wherein the regeneration operation is started if a cumulative amount of the oxidation gas to said CO remover for the oxidation has reached a predetermined threshold or more determined based on an upper limit of the integrated supply amount of ammonia.

17. The method for operating a hydrogen generator according to claim 1, wherein the regeneration operation is started if a cumulative amount of the gas containing the nitrogen-containing compound supplied from said gas supplying unit to said reformer has reached a predetermined threshold or more determined based on an upper limit of the integrated supply amount of ammonia.

18. The method for operating a hydrogen generator according to claim 17, wherein the upper limit of the integrated supply amount of ammonia is an integrated supply amount of ammonia supplied to said CO remover until a concentration of carbon monoxide in the hydrogen-containing gas which has passed through said CO remover reaches a predetermined concentration at which the regeneration operation needs to be started.

19. The method for operating a hydrogen generator according to claim 17, wherein the upper limit of the integrated supply amount of ammonia is an integrated supply amount of ammonia supplied to said CO remover until a concentration of oxygen in the hydrogen-containing gas which has passed through said CO remover reaches a predetermined concentration at which the regeneration operation needs to be started.

20. The method for operating a hydrogen generator according to claim 1, wherein the predetermined threshold is determined based on an upper limit of the integrated supply amount of ammonia.

21. The method for operating a hydrogen generator according to claim 1, wherein:
the carbon monoxide in the hydrogen-containing gas is removed by the oxidation by supplying an oxidation gas to the CO remover when not in the regeneration operation, and
supply of the oxidation gas is stopped in the regeneration operation.

22. A method for operating a fuel cell system, the method comprising steps of:
generating a hydrogen-containing gas through a reforming reaction in a reformer which is supplied with a raw material;
supplying a gas containing a nitrogen-containing compound to said reformer by a gas supplying unit;
removing, in a CO remover including an oxidation catalyst, carbon monoxide in the hydrogen-containing gas by oxidation with the use of the oxidation catalyst, the oxidation catalyst containing a metal to be poisoned by ammonia;
generating electric power in a fuel cell which is supplied with the hydrogen-containing gas which has passed through said CO remover and an oxygen-containing gas; and
starting a regeneration operation of said CO remover when a parameter regarding an integrated supply amount of ammonia supplied to said CO remover becomes equal to or more than a predetermined threshold with an increase in the integrated supply amount of ammonia, wherein:
the reformer generates the hydrogen-containing gas together with ammonia,
when the regeneration operation is not being executed, the hydrogen-containing gas containing the ammonia generated by the reformer is supplied to the CO remover, and
the integrated supply amount of ammonia is an integrated supply amount of the ammonia generated by the reformer.

23. The method for operating a fuel cell system according to claim 22, wherein the gas containing the nitrogen-containing compound is any one of the raw material containing the nitrogen-containing compound and air supplied to said reformer in a case where the reforming reaction is autothermal reforming or partial oxidation reforming.

24. The method for operating a fuel cell system according to claim 23, wherein the nitrogen-containing compound is any one of a nitrogen molecule, amine and isonitrile.

25. The method for operating a fuel cell system according to claim 22, further comprising steps of:
acquiring information related to a concentration of the nitrogen-containing compound in the gas containing the nitrogen-containing compound; and
setting a predetermined threshold based on the acquired information.

26. The method for operating a fuel cell system according to claim 25, wherein the information is any one of information regarding the concentration of the nitrogen-containing compound, information regarding a type of the gas containing the nitrogen-containing compound, positional information and information regarding a supplier of the gas containing the nitrogen-containing compound.

27. The method for operating a fuel cell system according to claim 22, wherein the step of starting the regeneration operation comprises steps of:
detecting a temperature of said CO remover; and
controlling the temperature of said CO remover so that the temperature becomes higher than a control temperature that is a temperature before starting the regeneration operation.

28. The method for operating a fuel cell system according to claim 27, further comprising replacing a gas in a gas passage included in the hydrogen generator with a purge gas, wherein the step of started the regeneration operation comprises steps of:
stopping supply of a oxidation gas to said CO remover; and
controlling, at a time of a stop operation of the hydrogen generator, the temperature of said CO remover so that the temperature becomes higher than the control temperature that is the temperature before starting the regeneration operation, before starting supplying the purge gas.

29. The method for operating a fuel cell system according to claim 22, wherein the step of starting the regeneration operation comprises steps of:
detecting a temperature of said CO remover; and
controlling the temperature of said CO remover so that the temperature becomes higher than a normal control temperature.

30. The method for operating a fuel cell system according to claim 29, further comprising replacing a gas in a gas passage included in the hydrogen generator with a purge gas, wherein the step of started the regeneration operation comprises steps of:
stopping supply of a oxidation gas to said CO remover; and
controlling, at a time of a stop operation of the hydrogen generator, the temperature of said CO remover so that the temperature becomes higher than the normal control temperature, before starting supplying the purge gas.

31. The method for operating a fuel cell system according to claim 22, wherein the step of started the regeneration operation comprises making a timing for starting supplying the oxidation gas used for the oxidation to said CO remover later than the timing at a time of a normal start-up operation of the hydrogen generator, at a time of a start-up operation of the hydrogen generator.

32. The method for operating a fuel cell system according to claim 22, wherein the step of the regeneration operation comprises making an amount of the oxidation gas supplied to said CO remover for the oxidation smaller than the amount at a time of a normal operation, at a time of a start-up operation of the hydrogen generator.

33. The method for operating a fuel cell system according to claim 22, wherein the regeneration operation is started if a cumulative operating time of the hydrogen generator has reached a predetermined threshold or more determined based on an upper limit of the integrated supply amount of ammonia.

34. The method for operating a fuel cell system according to claim 33, wherein the upper limit of the integrated supply amount of ammonia is an integrated supply amount of ammonia supplied to said CO remover until a concentration of carbon monoxide in the hydrogen-containing gas which has passed through said CO remover reaches a predetermined concentration at which the regeneration operation needs to be started.

35. The method for operating a fuel cell system according to claim 33, wherein the upper limit of the integrated supply amount of ammonia an integrated supply amount of ammonia supplied to said CO remover until a concentration of oxygen in the hydrogen-containing gas which has passed through said CO remover reaches a predetermined concentration at which the regeneration operation needs to be started.

36. The method for operating a fuel cell system according to claim 22, further comprising supplying water to said reformer, wherein:
the regeneration operation is started if a cumulative amount of the water supplied to said reformer has reached a predetermined threshold or more determined based on an upper limit of the integrated supply amount of ammonia.

37. The method for operating a fuel cell system according to claim 22, wherein the regeneration operation is started if a cumulative amount of the oxidation gas to said CO remover for the oxidation has reached a predetermined threshold or more determined based on an upper limit of the integrated supply amount of ammonia.

38. The method for operating a fuel cell system according to claim 22, wherein the regeneration operation is started if a cumulative amount of the gas containing the nitrogen-containing compound supplied from said gas supplying unit to said reformer has reached a predetermined threshold or more determined based on an upper limit of the integrated supply amount of ammonia.

39. The method for operating a fuel cell system according to claim 38, wherein the upper limit of the integrated supply amount of ammonia is an integrated supply amount of ammonia supplied to said CO remover until a concentration of carbon monoxide in the hydrogen-containing gas which has passed through said CO remover reaches a predetermined concentration at which the regeneration operation needs to be started.

40. The method for operating a fuel cell system according to claim 38, wherein the upper limit of the integrated supply amount of ammonia is an integrated supply amount of ammonia supplied to said CO remover until a concentration of oxygen in the hydrogen-containing gas which has passed through said CO remover reaches a predetermined concentration at which the regeneration operation needs to be started.

41. The method for operating a fuel cell system according to claim 22, wherein the predetermined threshold is determined based on an upper limit of the integrated supply amount of ammonia.

42. The method for operating a fuel cell system according to claim 22, wherein:
the carbon monoxide in the hydrogen-containing gas is removed by the oxidation by supplying an oxidation gas to the CO remover when not in the regeneration operation, and
supply of the oxidation gas is stopped in the regeneration operation.

43. The method for operating a fuel cell system according to claim 22, wherein electric power generation of the fuel cell is stopped in the regeneration operation.

* * * * *